US010336637B2

(12) United States Patent
Saslaw et al.

(10) Patent No.: US 10,336,637 B2
(45) Date of Patent: Jul. 2, 2019

(54) CLOSED-LOOP BIOREGENERATIVE WATER PURIFICATION SYSTEM FOR THE INTERNATIONAL SPACE STATION (ISS) AND FOR SUSTAINABLE MARS EXPLORATION

(71) Applicants: Jeremy Saslaw, Cooper City, FL (US); The United States of America as Represented by the Administrator of NASA, Washington, DC (US)

(72) Inventors: Jeremy Saslaw, Cooper City, FL (US); Luke Roberson, Titusville, FL (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 80 days.

(21) Appl. No.: 15/651,737

(22) Filed: Jul. 17, 2017

(65) Prior Publication Data
US 2019/0016620 A1  Jan. 17, 2019

(51) Int. Cl.
*C02F 9/00* (2006.01)
*B01D 5/00* (2006.01)
(Continued)

(52) U.S. Cl.
CPC ............ *C02F 9/00* (2013.01); *B01D 5/006* (2013.01); *B01D 53/24* (2013.01); *C05B 7/00* (2013.01);
(Continued)

(58) Field of Classification Search
CPC ...... C02F 9/00; C02F 2101/16; C02F 3/2853; C02F 2307/00; C02F 2305/00;
(Continued)

(56) References Cited

U.S. PATENT DOCUMENTS

| 2013/0134089 A1* | 5/2013 | Cote | C02F 3/30 |
| | | | 210/605 |
| 2015/0353397 A1* | 12/2015 | Cath | C02F 3/308 |
| | | | 210/195.1 |
| 2017/0129797 A1* | 5/2017 | Gaid | B01D 65/08 |

OTHER PUBLICATIONS

"CDI-LX Systems". Evoqua Water Technologies, Alpharetta, GA 30022: (2014) Evoqua Water Technologies, n.d. pp. 1-2.
(Continued)

*Primary Examiner* — Fred Prince
(74) *Attorney, Agent, or Firm* — Gregory L Mayback

(57) ABSTRACT

A water purification system comprises a bioreaction subsystem receiving contaminated input effluent and having a gas-lift anaerobic membrane bioreactor removing urea and organic matter to create a first effluent. A light-treatment subsystem receives the first effluent and exposes the first effluent to UV light to create a second effluent free from microorganisms. A reactor subsystem fluidically connects an ammonia-reducing reactor to the UV output and receives UV-treated second effluent and has a struvite regenerator connected to the ammonia-reducing reactor output, separating ammonia from the second effluent in the ammonia-reducing reactor, and outputting the ammonia. A separation subsystem fluidically connects to the reactor output and receives the second effluent substantially free from ammonia and has a continuous electro-deionization device separating brine/salts from the second effluent to produce potable water. A closed-loop includes an ammonia-converting subsystem and a sequential fertilizer producer.

16 Claims, 14 Drawing Sheets

(51) Int. Cl.
| | |
|---|---|
| B01D 53/24 | (2006.01) |
| C05F 17/02 | (2006.01) |
| C05F 17/00 | (2006.01) |
| C05G 3/00 | (2006.01) |
| C05B 7/00 | (2006.01) |
| C05D 9/00 | (2006.01) |
| C05D 1/02 | (2006.01) |
| C02F 3/28 | (2006.01) |
| C02F 1/32 | (2006.01) |
| C02F 1/70 | (2006.01) |
| C02F 1/46 | (2006.01) |
| C02F 3/32 | (2006.01) |
| C02F 1/469 | (2006.01) |
| C02F 101/38 | (2006.01) |
| C02F 101/16 | (2006.01) |
| B64G 1/60 | (2006.01) |

(52) U.S. Cl.
CPC .................. *C05D 1/02* (2013.01); *C05D 9/00* (2013.01); *C05F 17/009* (2013.01); *C05F 17/0081* (2013.01); *C05F 17/0264* (2013.01); *C05G 3/0064* (2013.01); *B64G 1/60* (2013.01); *C02F 1/325* (2013.01); *C02F 1/4695* (2013.01); *C02F 1/70* (2013.01); *C02F 3/2853* (2013.01); *C02F 3/322* (2013.01); *C02F 2101/16* (2013.01); *C02F 2101/38* (2013.01); *C02F 2303/04* (2013.01); *C02F 2305/00* (2013.01); *C02F 2307/00* (2013.01)

(58) Field of Classification Search
CPC .. C02F 2303/04; C02F 2101/38; C02F 3/322; C02F 1/4695; C02F 1/70; C02F 1/325; C05G 3/0064; C05D 1/02; C05D 9/00; C05B 7/00; B01D 5/006; B01D 53/24; C05F 17/0081; C05F 17/009; C05F 17/0264; B64G 1/60
USPC ........... 210/602, 603, 748.1, 748.13, 748.11, 210/748.17, 903, 252, 259
See application file for complete search history.

(56) References Cited

OTHER PUBLICATIONS

"How Ionpure CEDI Products, Work". Evoqua Water Technologies. [Youtube]. N.p., Feb. 2, 2015. [retrieved on Jul. 18, 2017]. Retrieved from the Internet<https://www.youtube.com/watch?v=gevn-nRssjnM>.
Abashar, M.E.E. et al., "Ultra-clean hydrogen production by ammonia decomposition". Journal of King Saud University—Engineering Sciences (2016), http://dx.doi.org/10.1016/j.jksues.2016.01.002.
Blair, Robert A. et al., "Feasibility of Anaerobic Membrane Rioreactors (AnMBR) for Onsite Sanitation and Resource Recovery (nutrients, Energy and Water) in Urban Slums". Water Science & Technology 72.9 (2015): pp. 1543-1551.
Dimascio, Felice et al., "Continuous Electrodeionization—Production of High-Purity Water without Regeneration Chemicals". The Electrochemical Society Interface (1998): pp. 26-29.
Hand, David W. et al, "Disinfection with Ultraviolet Light". Principles of Water Treatment. By Kerry J. Howe. vol. 1. Somerset: Wiley (2012): pp. 543-555. ProQuest Ebary. Jun. 15, 2016.
Hangford, Anthony J. et al., "Advanced Life Support Baseline Value and Assumptions Document". Publication No. NASA/CR-2004-208941. Houston, Texas: National Aeronautics and Space Administration (NASA), Johnson Space Center. (2004): <http://ston.jsc.nasa.gov/collections/NTRS>.
Lennox, John E. et al., "Reactor Theory and Practice". Biofilms: The Hypertextbook. Chapter 8 Methods for Studing Biofilms, By Alfred B. Cunningham. N.p.: n.p., n.d. N. pag. Plug Flow Reactor. Aug. 3, 2016.
Li, G. et al., "Ammonia decomposition in catalytic membrane reactors: Simulation and experimental studies". 2012 American Institute of Engineers. Journal, (2013). vol. 59: No. 1. pp. 168-179.
Lunn, Griffin M. et al., "A Novel Ion Exchange System to Purify Mixed ISS Waste Water Brines for Chemical Production arid Enhanced Water Recovery". Proc. of 44th International Conference on Environmental Systems, Jul. 13-17, 2014,Tuscon, Arizona. pp. 1-18.
Lunn, Griffin M. et al., "Strategies for Stabilizing Nitrogenous Compounds in ECLSS Wastewater. Top-down System Design and Unit Operation Selection with Focus on Bio-regenerative Processes for Short and Long Term Scenarios". Proc. of 42nd International Conference on Environmental Systems, San Diego, California. N.p.: n.p., n.d. Publication Date Unknown.
Matula, Emily E. et al., "Feasibility of Photobioreactor Systems for Use in Multifunctional Environmental Control and Life Support System for Spacecraft and Habitat Environments". Proc. of 46th International Conference on Environmental Systems, Jul. 10-14, 2014, Vienna, Austria, ICES-2016-147, pp. 1-20.
Miles II, John D. et al., "Separation and Purification of Mineral Salts from Spacecraft Wastewater Processing via Electrostatic Beneficiation". NASA USRP—Internship Final Report, Summer 2013 Session, pp. 1-8.
Pickering, Karen D. et al., "Alternative Water Processor Test Development". 43rd International Conference on Environmental Systems, International Conference on Environmental Systems, (ICES), (AIAA 2013-3401), Vail, CO, https://doi.org/10.2514/62013-3401, (2013).
Prieto, Ana Lucia et al., "Development and Start up of a Gas-lift Anaerobic Membrane Bioreactor (Gl-AnMBR) for conversion of Sewage to Energy, Water and Nutrients". Journal of Membrane Science, 441 (2013): pp. 158-167.
Prieto, Ana L. et al., "Sequential Anaerobic and Algal Membrane Bioreactor (A2MBR) System for Sustainable Sanitation and Resource Recovery from Domestic Wastewater". University of South Florida, Scholar Commons, (2011). Graduate Theses and Dissertations., http://scholarcommons.usf.edu/etd/3296.
Ruttley, Tara et al., "Boiling It down to the Bubbles: It Is about Heat Transfer". Web log post. NASA Blogs. NASA, Apr. 15, 2011. pp. 5-8, https://blogs.nasa.gov/ISS_Science_Blog/author/jnimon/page/6/.
Singh, Chandra et al., "Simulation of Ammonia Synthesis Reactors". Articles, Ind. Eng. Chem. Process. Des. Dev. vol. 18, No. 3, (1979), pp. 354-370, India.
Stutte, Gary W. et al., "Plant Science". A Researcher's Guide to: International Space Station. N.p.: National Aeronautics and Space Administration (NASA), n.d. N. (2015), pp. 1-50.
Yeh, Daniel H. et al., "Renewable Resource Recovery from Wastewater". Department of Civil and Environmental Engineering, University of South Florida, Apr. 25, 2014. pp. 1-91.

* cited by examiner

CLOSED-LOOP BIOREGENERATIVE WATER PURIFICATION SYSTEM FOR THE INTERNATIONAL SPACE STATION (ISS) AND FOR SUSTAINABLE MARS EXPLORATION

STATEMENT REGARDING FEDERALLY SPONSORED RESEARCH OR DEVELOPMENT

The invention described herein was made in the performance of work under a NASA contract and by employees of the United States Government and may be manufactured and used by or for the Government of the United States of America for governmental purposes without the payment of any royalties thereon or therefore.

FIELD OF THE INVENTION

The present systems, apparatuses, and methods lie in the field of water purification. The present disclosure relates to a closed-loop, bioregenerative, water purification system for space structures, such as the International Space Station (ISS), and interplanetary missions, such as exploration of Mars.

BACKGROUND OF THE INVENTION

It is known that the current ISS water recovery and purification system is not closed-loop and, because of this, many resources are lost to waste. The current water recovery and purification system aboard the ISS is both open loop, meaning that it requires external inputs, and it is also inefficient. The current system works in two phases. The first phase is a Urine Processor Assembly (UPA) that processes the urine and flush water. The UPA first phase takes in 5.07 kg/day of inputted urine and flush $H_2O$, and outputs 3.8 kg/day of non-potable $H_2O$, which represents a loss of 25.0% of its input. This loss is waste in the form of a brine puck, which cannot be used in any capacity on the ISS, and is stored for later incineration and disposal. A brine puck is generated each time the UPA operates. Following the UPA in a second phase, a Water Processor Assembly (WPA) takes as inputs the non-potable water from the UPA as well as hygiene water, Sabatier water, and cabin condensate. These inputs total 9.1 kg/day. From these inputs, the WPA produces 7.7 kg/day of potable water. This means that every time the WPA operates, another 15.3% of the UPA output is lost. Additionally, the WPA system requires filter changes every few months and demands consumable oxygen for the system to operate.

Many inputs are lost to useless wastes in the current water purification system aboard the ISS. This system costs NASA money in restocking fees and does not provide a viable option for water purification and life support for future Mars applications with NASA's current propulsion systems. By creating a closed-loop water purification system where all inputs are turned into valuable outputs, NASA can move closer to achieving its goal of reaching Mars.

Another system that is being developed is referred to as an Alternative Water Processor (AWP), which is a part of NASA's "The Next Generation Life Support Project" as a candidate water-recovery system for long duration exploration missions. The goal of this project is to develop technologies that allow for spacecraft life support, in order to enable human presence beyond low Earth orbit. Specifically, the AWP is being developed to be a capable system for recycling wastewater from sources expected to be used in future exploration missions. The AWP is detailed in the paper "Alternative Water Processor Test Development." Located at Johnson Space Center in the Advanced Water Recovery System Development Facility (AWRSDF), the AWP has two primary parts: a biological water processor (BWP) system and a forward osmosis secondary treatment system (FOST). The BWP system is made up of four Membrane Aerated Biological Reactors (MABR), which operate with oxygen as a consumable. Oxygen, a requirement for aerobic bacterial metabolism, must be supplied and resupplied to the system, which is something that does not work for a closed-loop system. The wastewater is biodegraded through nitrification/denitrification, which operates with oxygen. The MABR units were developed at Texas Tech University. A second part of the system is the FOST, which includes a forward osmosis (FO) membrane module and a reverse osmosis (RO) membrane module. These systems utilize membranes that are highly susceptible to fouling, which creates a consumable, and are inefficient purifiers of water. As a whole, the AWP is not an applicable option for long duration space travel, primarily due to its need for consumables. Additionally, this system does not produce valuable additional outputs like nutrients and clean gases.

An improved, higher efficiency system, where all inputs are converted into useful outputs, would be an asset, especially to NASA and its missions. Due to a loss of resources, the current system on the ISS, as well as the AWP, are not optimal for a manned mission to Mars based on current propulsion systems.

It would be beneficial to provide a new and improved sequence of primary water purification methods, combined with various secondary subsystems for use on space structures, such as the ISS, and to be applied towards further sustainable applications, such as for living on Mars. Thus, a need exists to overcome the problems with the prior art systems, designs, and processes as discussed above.

SUMMARY OF THE INVENTION

The systems, apparatuses, and methods described overcome the hereinafore-mentioned disadvantages of the heretofore-known devices and methods of this general type and provide proprietary systems and methods of primary water purification that improve efficiency of the current system and, when combined with various secondary subsystems, provide a completely closed loop system architecture.

With the foregoing and other objects understood, there is provided, a combination of various commercially based processes, novel subsystems, and next-generation research based water purification techniques. This solution is closed-loop, whereby minimal external inputs (other than energy) are required to operate the system. The described architecture also includes bioregenerative aspects to allow for a further closed-loop system. In addition to clean potable water, the proposed system also produces various other useful outputs. Two secondary subsystems exist within the overall system architecture, each with its own value and specific purpose.

A first secondary subsystem, an Ammonia Converting Configuration (ACC), converts ammonia gas (an output from a primary subsystem) into hydrogen ($H_2$) and nitrogen ($N_2$) gases, both necessities on the ISS. The hydrogen gas can be used for launch propulsion applications and the nitrogen gas can be used for a resupply of breathing air for life support. Once the necessary limits of $H_2$ and $N_2$ gases are reached, the purified ammonia gas can be used as an additional ammonia accumulator to replace leaked ammonia from the thermal control system currently used on the ISS.

A second secondary subsystem, a Sequential Fertilizer Producer (SFP), comprises a series of ion exchange resins selectively chosen to produce various desired plant fertilizers, as well as useful salts and acids. In an exemplary embodiment, a water purification (WP) system is supplemented by adding a viable hydroponic plant system to utilize these excess plant fertilizers. The plants, fed by these fertilizers, will produce food resources for the crew in space, whether on the ISS or on Mars.

In addition to the production of hydrogen and nitrogen gases and plant fertilizers, the WP system outputs:
  methane, which can be used as energy to operate the system;
  carbon dioxide ($CO_2$), which can be used for plant growth;
  various bases (caustics) and acids, which have many uses in the WP system;
  trisodium phosphate ($Na_3PO_4$), which can be used as a food additive and exercise performance enhancement; and
  sodium sulfate ($Na_2SO_4$), which can be used as an inert drying agent for laboratory experiments aboard the ISS.

The WP system, of course, produces potable drinking water at an optimal efficiency, which is the primary output and purpose of the entire system.

A Gas-Lift Anaerobic Membrane Bioreactor (GI-AnMBR) is first implemented to remove urea and organic matter. The flow is then run under an ultraviolet (UV) light, killing the microorganisms. A Magnesium Phosphate Plug Flow Reactor (MP-PFR) combined with a Struvite Regenerator (SR) is then used to remove ammonia efficiently and without losing any resources. Ammonia gas is output by this subsystem and is sent to an Ammonia Converting Configuration (ACC) secondary subsystem to produce nitrogen and hydrogen gases. The water flow is then sent through a Continuous Electro-Deionization (CEDI) device, which separates the brine (salts) from the water, thereby producing potable water. The brine solution is concurrently sent to the Sequential Fertilizer Producer (SFP) secondary subsystem, which produces fertilizers to be used in a hydroponic plant system, as well as other valuable resources.

The four primary subsystems—GI-AnMBR, UV light, MP-PFR/SR, and CEDI—are all vital to achieving potable water. The two secondary subsystems—ACC and SFP—provide options to completely close the loop of the entire system, but are not necessary for producing clean water, the primary desired output of this system. Ideally, a hydroponic plant system would also be included in the system architecture, as many outputs from the WP system are extremely useful plant fertilizers. By sending these fertilizers to plants, food is created, even further closing the loop of the system architecture.

Although the systems, apparatuses, and methods are illustrated and described herein as embodied in a closed-loop bioregenerative water purification system for the International Space Station (ISS) and for sustainable Mars exploration, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the systems, apparatuses, and methods.

With the foregoing and other objects in view, there is provided, a water purification system comprising a bioreaction subsystem comprising an input receiving contaminated input effluent, a gas-lift anaerobic membrane bioreactor that removes at least one of urea and organic matter from the input effluent to create a first effluent, and a bioreaction output through which passes the first effluent, a light-treatment subsystem comprising an input fluidically connected to the bioreaction output and receiving the first effluent, an ultraviolet (UV) light exposing the first effluent to UV light to create a second effluent substantially free from microorganisms, and a UV output through which passes the second effluent, a reactor subsystem comprising an ammonia-reducing reactor comprising an input fluidically connected to the UV output and receiving the UV-treated second effluent and a reactor output, and a struvite regenerator fluidically connected to the reactor output, separating ammonia from the second effluent in the an ammonia-reducing reactor, and outputting the ammonia, and a separation subsystem comprising an input fluidically connected to the reactor output and receiving the second effluent substantially free from ammonia, a continuous electro-deionization device separating brine/salts from the second effluent to produce potable water, and having a potable water output.

With the objects in view, there is also provided a closed-loop water purification system comprising a bioreaction subsystem comprising an input receiving contaminated input effluent, a gas-lift anaerobic membrane bioreactor that removes at least one of urea and organic matter from the input effluent to create a first effluent, and a bioreaction output through which passes the first effluent, a light-treatment subsystem comprising an input fluidically connected to the bioreaction output and receiving the first effluent, an ultraviolet (UV) light exposing the first effluent to UV light to create a second effluent substantially free from microorganisms, and a UV output through which passes the second effluent, a reactor subsystem comprising an ammonia-reducing reactor comprising an input fluidically connected to the UV output and receiving the UV-treated second effluent and a reactor output, and a struvite regenerator fluidically connected to the reactor output, separating ammonia from the second effluent in the ammonia-reducing reactor, and outputting the ammonia, a separation subsystem comprising an input fluidically connected to the reactor output and receiving the second effluent substantially free from ammonia, a continuous electro-deionization device separating brine/salts from the second effluent to produce potable water, and having a potable water output, an ammonia-converting secondary subsystem receiving the ammonia output by the struvite regenerator and outputting at least one of nitrogen gas and hydrogen gas, and a sequential fertilizer producer secondary subsystem receiving the brine from the continuous electro-deionization device and producing fertilizers for use in a hydroponic plant system, the bioreaction subsystem, the light-treatment subsystem, the reactor subsystem, the separation subsystem, the ammonia-converting secondary subsystem, and the sequential fertilizer producer being connected together to as a closed-loop system.

In accordance with another feature, the gas-lift anaerobic membrane bioreactor receives input energy selected from at least one of thermal energy and electrical energy.

In accordance with a further feature, the gas-lift anaerobic membrane bioreactor outputs at least one of solid fertilizers, methane, and carbon dioxide.

In accordance with an added feature, methane output by the gas-lift anaerobic membrane bioreactor is recirculated and used to provide energy to the gas-lift anaerobic membrane bioreactor.

In accordance with an additional feature, there is provided a dissolver that converts the solid fertilizers into liquid fertilizers and the solid fertilizers output by the gas-lift anaerobic membrane bioreactor are passed through the dissolver.

In accordance with yet another feature, the microorganisms include at least one of viruses, cysts, *salmonella, E. coli*, Typhoid Fever, Polio, Cholera, Infectious Hepatitis, Bacteria, Coliform, Giardia, *Cryptosporidium*, Flu, Dysentery, and Meningitis.

In accordance with yet a further feature, the ultraviolet light comprises an ultraviolet lamp and an external transparent quartz sleeve surrounding the lamp and protecting the lamp from the first effluent passing therethrough.

In accordance with yet an added feature, the ammonia-reducing reactor removes ammonia from the second effluent with at least one of a magnesium phosphate plug flow reactor, algae, and ammonia reducing techniques.

In accordance with yet an additional feature, the ammonia-reducing reactor uses at least one of an additional regenerator and a membrane to regenerate the magnesium phosphate.

In accordance with again another feature, the ammonia-reducing reactor uses at least one of an additional regenerator and a membrane to filter the effluent of the ammonia-reducing reactor.

In accordance with again a further feature, the continuous electro-deionization device comprises a top, an anode, a cathode opposite the anode and defining a central axis, a power source supplying a DC current directed along the central axis, ion exchange membranes of cation selective resins between the anode and the cathode to block anions and water molecules and anion selective resins between the anode and the cathode to block cations and water molecules, the ion exchange membranes forming dilute chambers and concentrate chambers, and the second effluent is fed into the top of the continuous electro-deionization device and is pressurized downwards to be separated into the dilute and concentrate chambers.

In accordance with again an added feature, there is provided an ammonia-converting secondary subsystem receiving the ammonia output by the struvite regenerator and outputting at least one of nitrogen gas and hydrogen gas.

In accordance with again an additional feature, the ammonia-converting secondary subsystem receives the ammonia as a liquid-gas solution of ammonia and water and/or water vapor, heats the liquid-gas solution until fully gaseous, directs the gaseous solution into a gas centrifuge where ammonia gas separates from the water vapor and is output into two respective exits, has a condenser receiving the separated water vapor and cooling the water vapor into liquid water and introducing the liquid water into the separation subsystem, and has a fixed-bed membrane reactor receiving the ammonia gas and decomposing the ammonia gas into the nitrogen gas and the hydrogen gas.

In accordance with still another feature, there is provided a sequential fertilizer producer secondary subsystem receiving the brine from the continuous electro-deionization device and producing fertilizers for use in a hydroponic plant system.

In accordance with a concomitant feature, the sequential fertilizer producer secondary subsystem comprises a series of ion exchange resins and outputs sodium hydroxide that is input to the ammonia-reducing reactor and the fertilizers comprise at least one of trisodium phosphate, tripotassium phosphate, sodium sulfate, and potassium sulfate.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
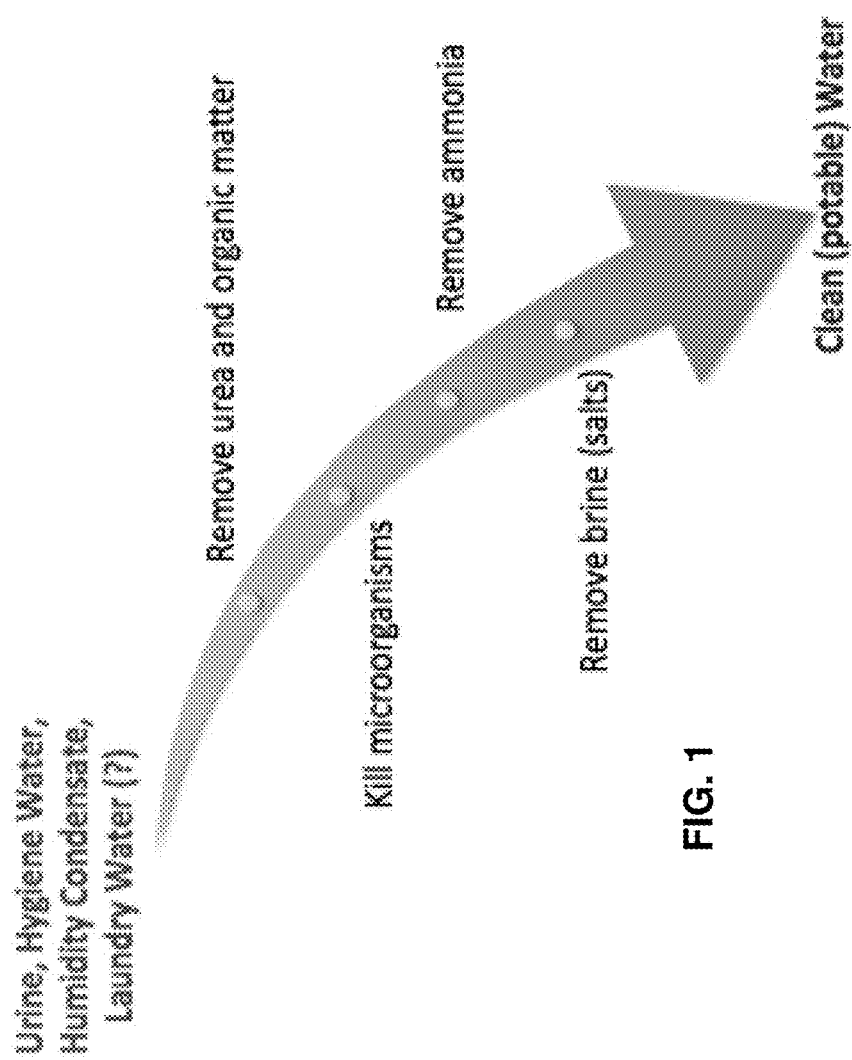
FIG. 1 is a functional flow diagram of an exemplary embodiment of a water purification system, illustrating necessary steps to arrive from a set of desired inputs to a desired output.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a functional flow diagram of an exemplary embodiment of a water purification system. This diagram illustrates the necessary steps between receiving desired inputs to producing a desired output. There are three principal inputs to the WP system—urine, hygiene water, and humidity condensate. A fourth input, laundry water, is a possible alternative embodiment and will require purification of the soapy products used to clean clothes. As used herein, any mixture of the inputs to the WP system will be referred to as effluent.

These three to four sources are fed simultaneously into the system, and an overarching four-step sequential purification process occurs. First, urea and other organic matter are removed from the effluent. This is followed by killing the microorganisms (including bacteria and viruses), removing the ammonia remaining in the effluent, and, then, finally separating the brine (salts) from the permeate. After completion of these four steps, potable water is output.

While FIG. 1 explains the necessary steps to achieve potable water, this is relatively well understood and straightforward, but the difficult task is achieving these functions in a closed-loop and efficient manner.

Figure 2:
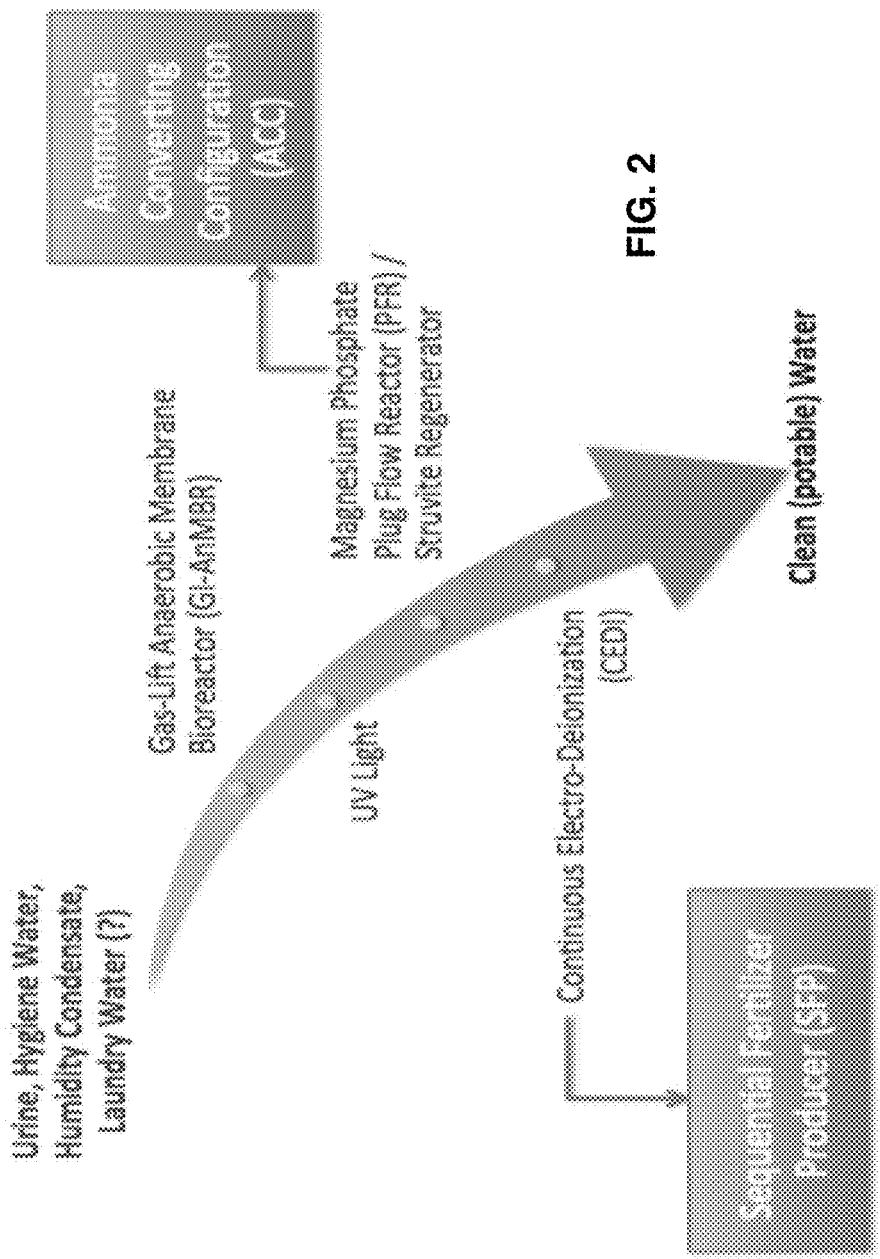
FIG. 2 is a systematic process flow diagram of an exemplary embodiment of a water purification system, illustrating each step and subsystem implemented to arrive from a set of desired inputs to a desired output.

FIG. 2 shows a systematic process flow diagram of another exemplary embodiment of a water purification system, illustrating each step and subsystem in order to move from receiving the desired inputs to achieving the desired output. A Gas-Lift Anaerobic Membrane Bioreactor (GI-AnMBR) is first implemented to remove urea and organic matter. The flow is then run under an ultraviolet (UV) light to kill any microorganisms present. A Magnesium Phosphate Plug Flow Reactor (MP-PFR) combined with a Struvite Regenerator (SR) is then used to remove ammonia efficiently and without losing any resources. Ammonia gas is output by this subsystem and this gas is sent to an Ammonia Converting Configuration (ACC) secondary subsystem to produce nitrogen and hydrogen gases. The resulting effluent flow is then sent through a Continuous Electro-Deionization (CEDI) device, which separates the brine (salts) from the effluent, thereby producing potable water. The brine solution is concurrently sent to a Sequential Fertilizer Producer (SFP) secondary subsystem, which produces fertilizers to be used in a hydroponic plant system, as well as other valuable resources.

Figure 3:
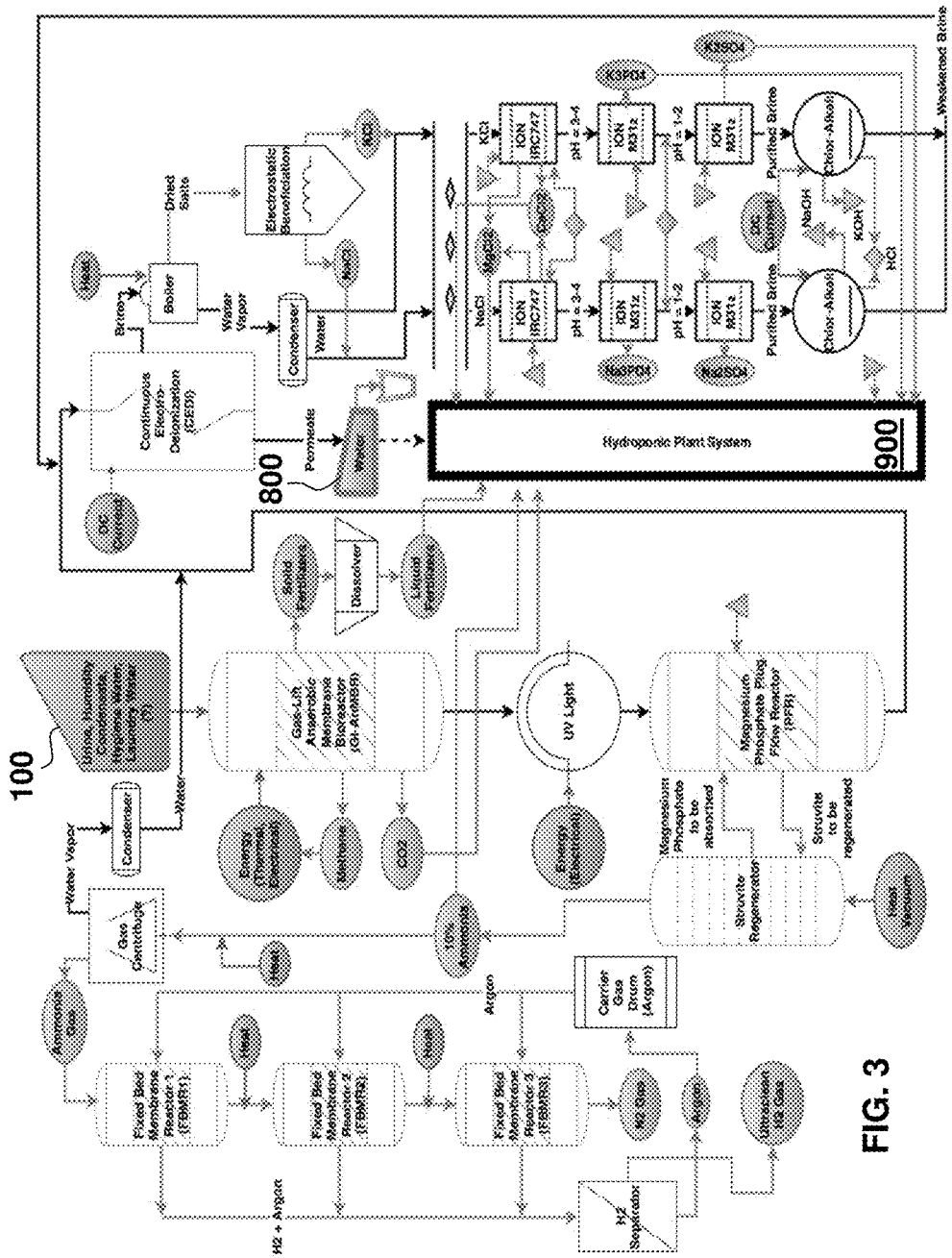
FIG. 3 is a diagrammatic block and process flow diagram of an exemplary embodiment of a water purification system.

FIG. 3 introduces a full state diagram of the exemplary water purification system illustrated in FIG. 2. The following figures will describe specifics of each individual part, but it is noted that the inputs begin in FIG. 3 at collector tank 100. As explained, these inputs include urine, humidity condensate, hygiene water, and possibly laundry water. The flow then moves downwards in the diagram into the GI-AnMBR, and the rest of the system can be traced and followed from there on. All external inputs are shown in red, while all outputs (whether reintegrated into the system or not) are shown in blue. Solid lines designate both the primary flow of the effluent, as well as each process. Additionally, both secondary subsystems (ACC and SFP) are illustrated in the diagram and are explained in detail below. It is finally noted that potable water is output from the system at output tank 800. Finally, a hydroponic plant system is notated with reference numeral 900.

Figure 4:
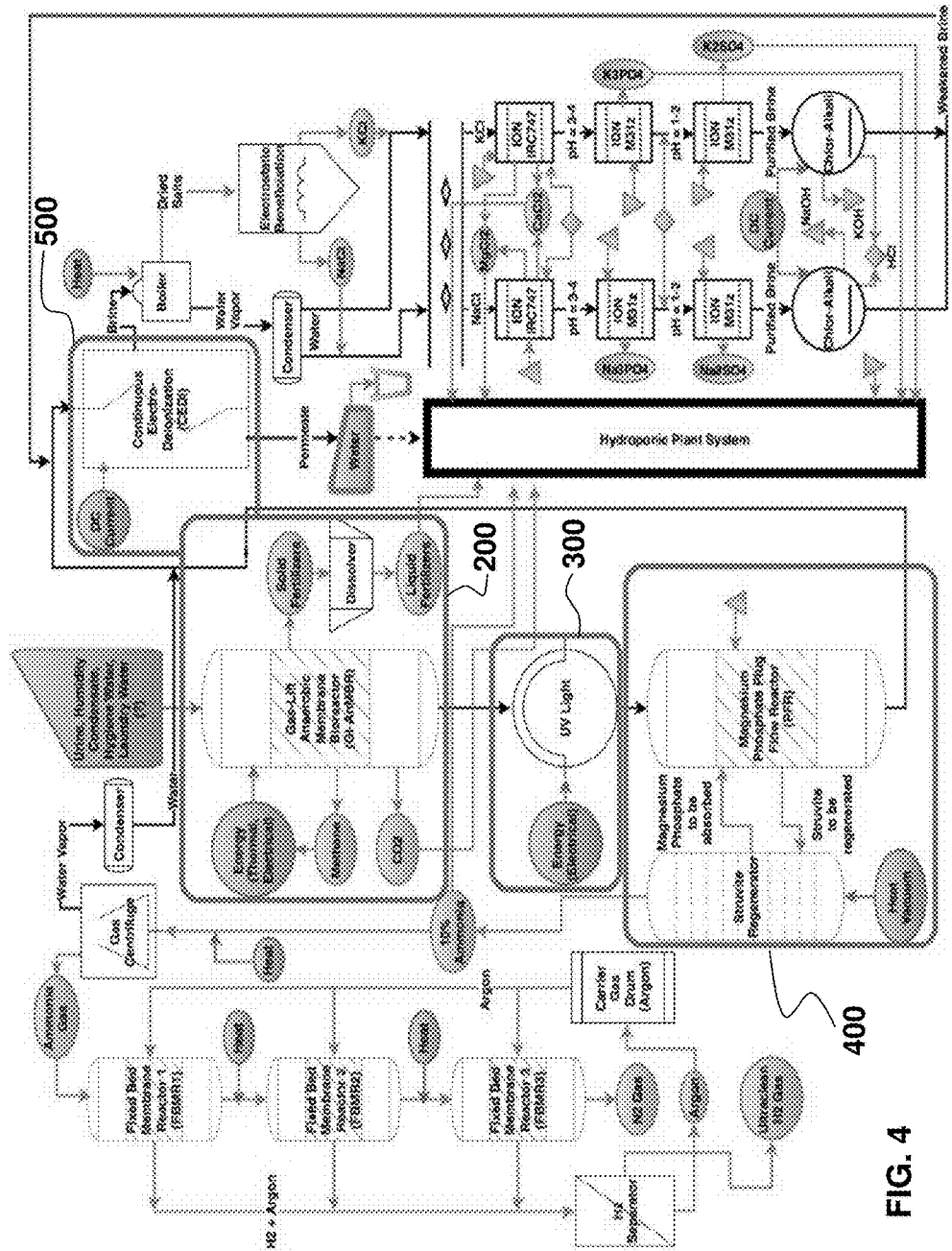
FIG. 4 is a diagrammatic block and process flow diagram of the water purification system of FIG. 3 with indications of four primary subsystems.
Figure 5:
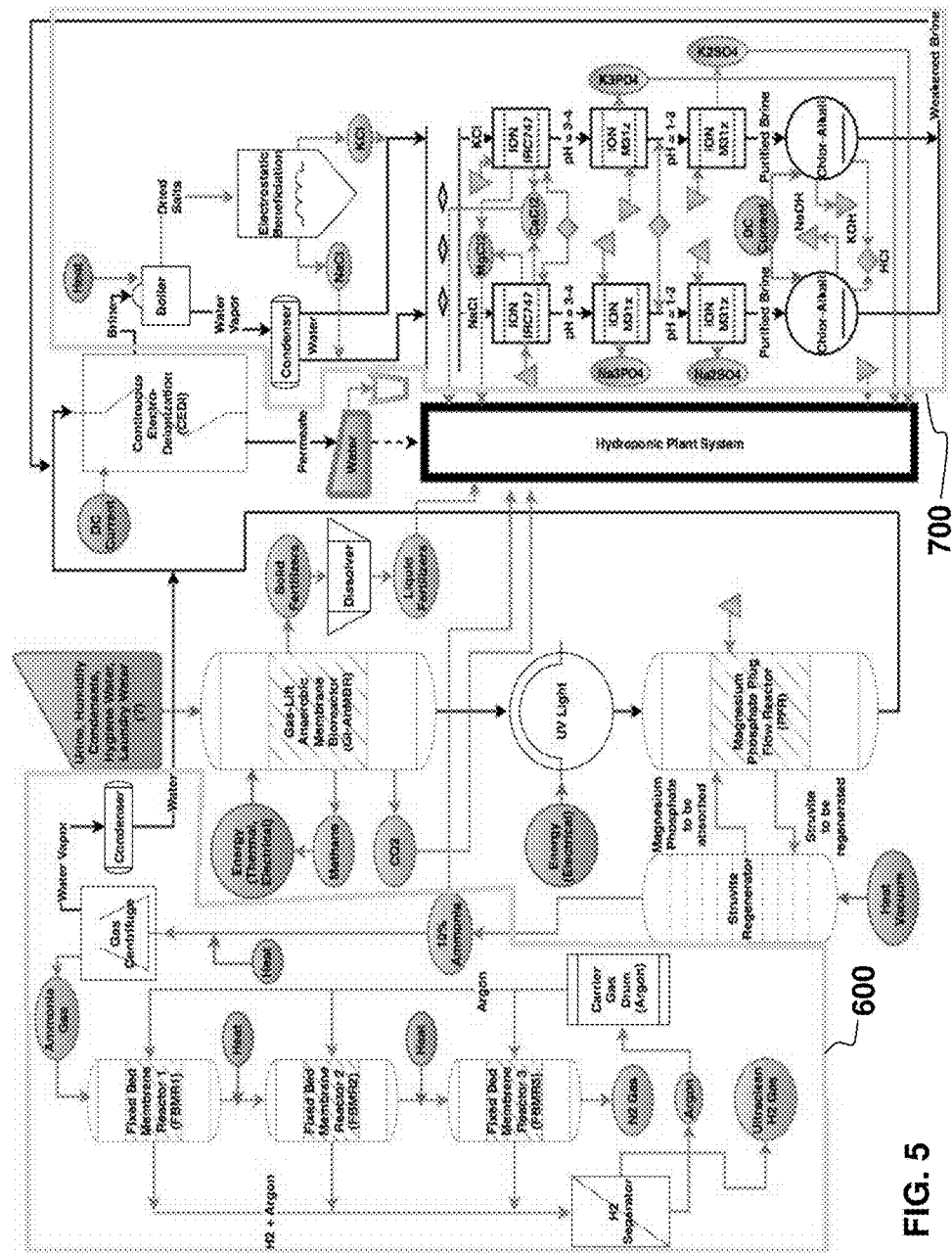
FIG. 5 is a diagrammatic block and process flow diagram of the water purification system of FIG. 3 with indications of two secondary subsystems.

FIG. 4 shows the same full state diagram of FIG. 3 but designates each of the four primary subsystems. The first stage is the GI-AnMBR primary subsystem 200. Following this is the UV light primary subsystem 300, which is followed by the MP-PFR/SR primary subsystem 400 and the CEDI primary subsystem 500. FIG. 5 shows the same full state diagram of FIGS. 3 and 4, but designates where each of the two secondary subsystems exists. The ACC 600 appears on the left of FIG. 5, while the SFP 700 appears on the right of FIG. 5.

As the remainder of the detailed description of the exemplary embodiments are read and understood, it is recommended that one of FIG. 3, 4, or 5 is referenced while the remaining figures are analyzed. This will aid in a clear and holistic understanding of the complete WP system architecture while individual components are explained.

The first step in the WP process is to remove the organic material—most notably urea. This is accomplished by coupling an anaerobic membrane with biological processes. Additionally, by using an anaerobic membrane the need for oxygen is eliminated, thus maintaining the closed loop. By achieving membrane separation and biological conversion synergistically, results are achieved that are not possible by each one occurring individually.

Figure 6:
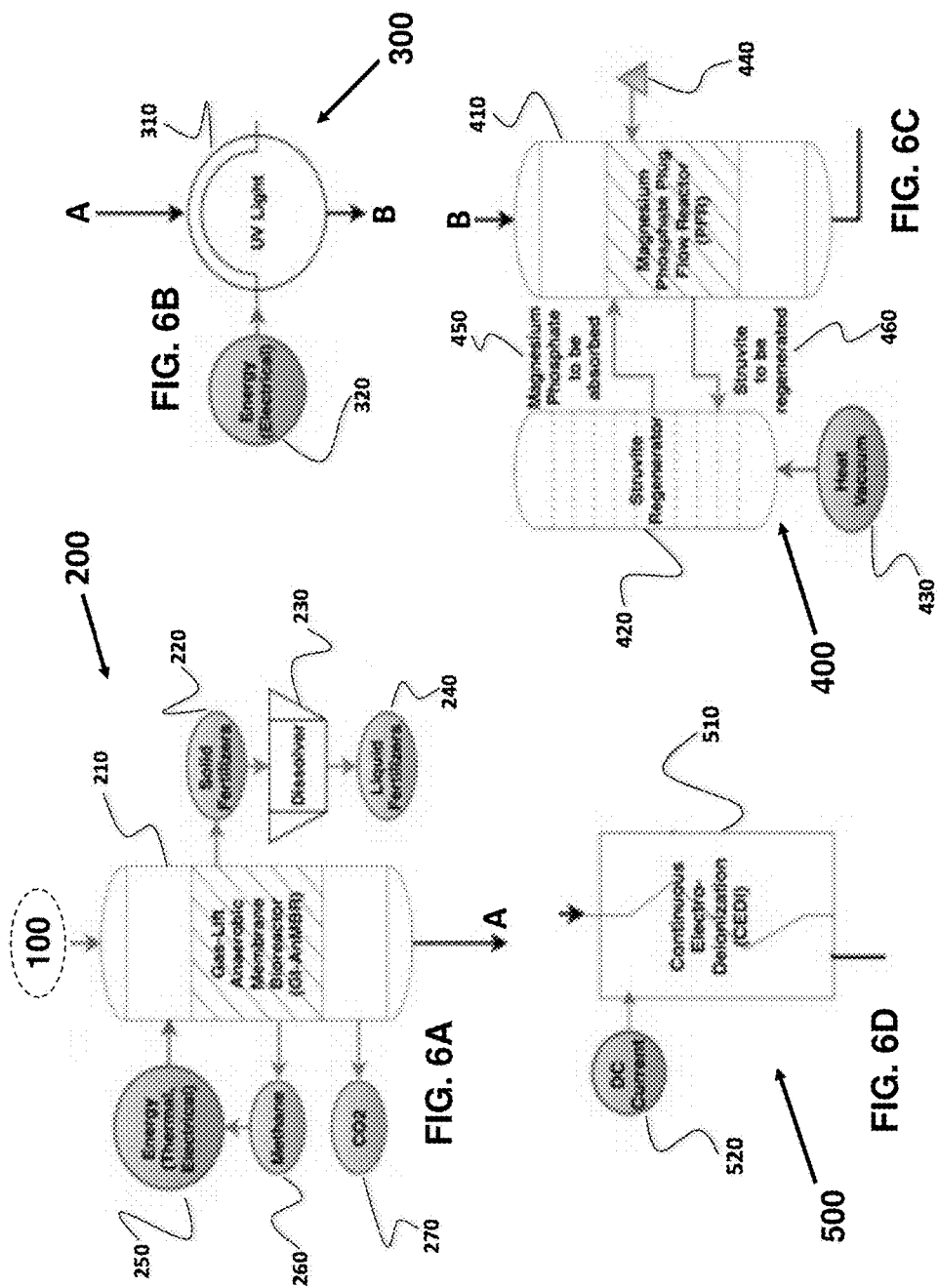
FIG. 6A is a fragmentary, block diagram of an exemplary embodiment of a Gas-Lift Anaerobic Membrane Bioreactor primary subsystem within the system of FIG. 3.
FIG. 6B is a fragmentary, block diagram of an exemplary embodiment of a UV light primary subsystem within the system of FIG. 3.
FIG. 6C is a fragmentary, block diagram of an exemplary embodiment of a Magnesium Phosphate Plug Flow Reactor (MP-PFR)/Struvite Regenerator (SR) primary subsystem within the system of FIG. 3.
FIG. 6D is a fragmentary, block diagram of an exemplary embodiment of a Continuous Electro-Deionization (CEDI) primary subsystem within the system of FIG. 3.

As seen in FIG. 6A, the GI-AnMBR primary subsystem 200 is expanded. The fluid flow input from the collection tank 100 enters a bioreactor 210 and exits the bioreactor 210 through bioreactor output A. The only necessary input to the bioreactor is energy 250, which can be in the form of thermal or electrical energy. There are three outputs generated by the bioreactor—solid fertilizers 220, methane 260, and carbon dioxide ($CO_2$) 270. The methane 260 output is recirculated into the GI-AnMBR 210 as additional energy 250. Separately, the solid fertilizers 220 are passed through a dissolver 230, which converts the solid fertilizers 220 into liquid fertilizers 240, because fertilizers in liquid form can be used efficiently in the hydroponic plant system 900, the use of which is indicated in FIGS. 3 to 5 with an output arrow.

The input effluent 100 to the GI-AnMBR 200 gets minimally pretreated, before entering the anaerobic membrane bioreactor 210, where a membrane process (ultrafiltration, for example) is implemented in tandem with a suspended growth bioreactor to perform anaerobic digestion. A key aspect of this system is that a dual phase air-lift flow is used, which consumes less energy than a cross-flow configuration.

The GI-AnMBR system 210 takes advantage of the idea that "wastewater" is not necessarily waste that cannot be reused. For example, chemical oxygen demand (COD) is an energy source that can be harnessed. In addition to energy generation in the form of methane 260, the GI-AnMBR has additional benefits of fertilizer recovery and reduced sludge generation. The system uses biogas produced inherently to provide a two-phase flow through vertically placed tubular membranes, helping to achieve the membrane filtration described above. The inclusion of biogas bubbles in the membrane feed decreases membrane fouling due to an additional shearing force over the surface of the membrane. The only external input that this system requires is excess thermal and/or electrical energy 250, which is available in abundance on space structures, for example, when generated by solar panels (and supplemented by the generation of methane 260).

Figure 10:
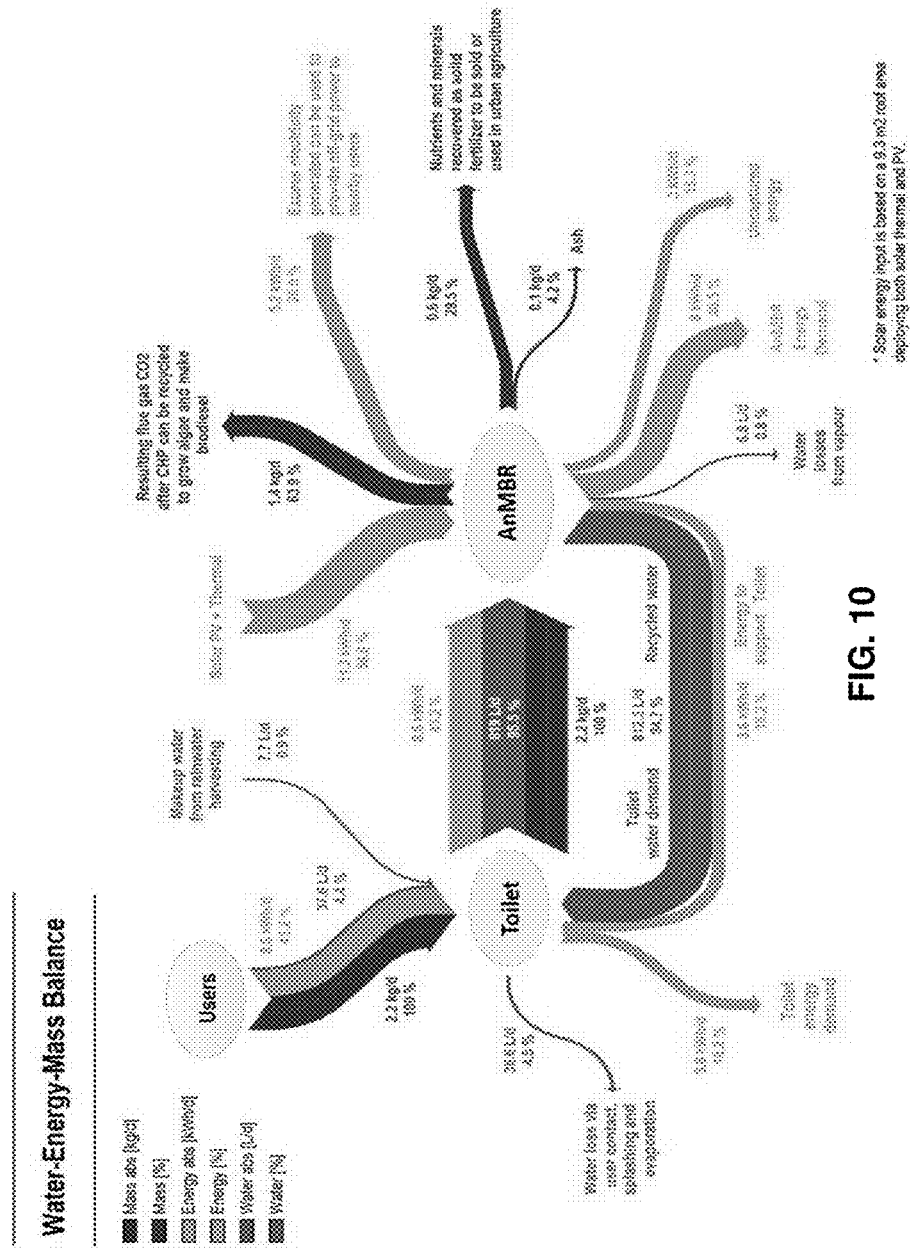
FIG. 10 is a diagrammatic representation of a water-energy-mass balance for a combined eToilet and Gas-Lift Anaerobic Membrane Bioreactor (GI-AnMBR) system.

The performance of the GI-AnMBR primary subsystem 200 is approximately 98% removal of COD and 95% removal of Total Organic Carbon (TOC). The GI-AnMBR primary subsystem 200 was tested (terrestrially) using an eToilet, and the associated water-energy-mass balance can be seen in FIG. 10, which is reproduced from a paper titled "Feasibility of anaerobic membrane bioreactors (AnMBR) for onsite sanitation and resource recovery (nutrients, energy and water) in urban slums" by Robert A. Bair et al at 7. This figure illustrates how all mass, energy, and water was distributed throughout the terrestrial test. All of the daily mass input begins with the users, and additionally is fully transferred from the toilet to the AnMBR. From the AnMBR, mass is distributed primarily to $CO_2$ gas (63.9%), while another 29.5% is sent to nutrients and minerals for solid fertilizers, and another 4.2% produces ash. As the analysis shifts to the daily energy, it is noted that 43.2% of the energy needed to operate the systems come from the users' inputs into the toilet, which then is fully processed within the AnMBR. Energy is then distributed to and from the AnMBR in many ways, which can be seen in full in FIG. 10. It is noted that solar and thermal energy are used to support the AnMBR, while energy needs to be saved to operate both devices (AnMBR and toilet). Finally, the analysis shifts to water, where only 5.3% of the total water dealt with on a daily basis in this setup comes from the users. This is primarily a result of water needing to be already stored in the toilet prior to use. One-hundred percent (100%) of the total water on a daily basis interacts with the toilet, where 95.5% is transferred to the AnMBR and 4.5% is lost due to careless user contact, splashing, and evaporation while using the toilet. This would not occur in space due to careful practices and better mechanisms for using the toilet. It is also noted that 94.7% of the daily water processes from the AnMBR back to the toilet.

Figure 11:
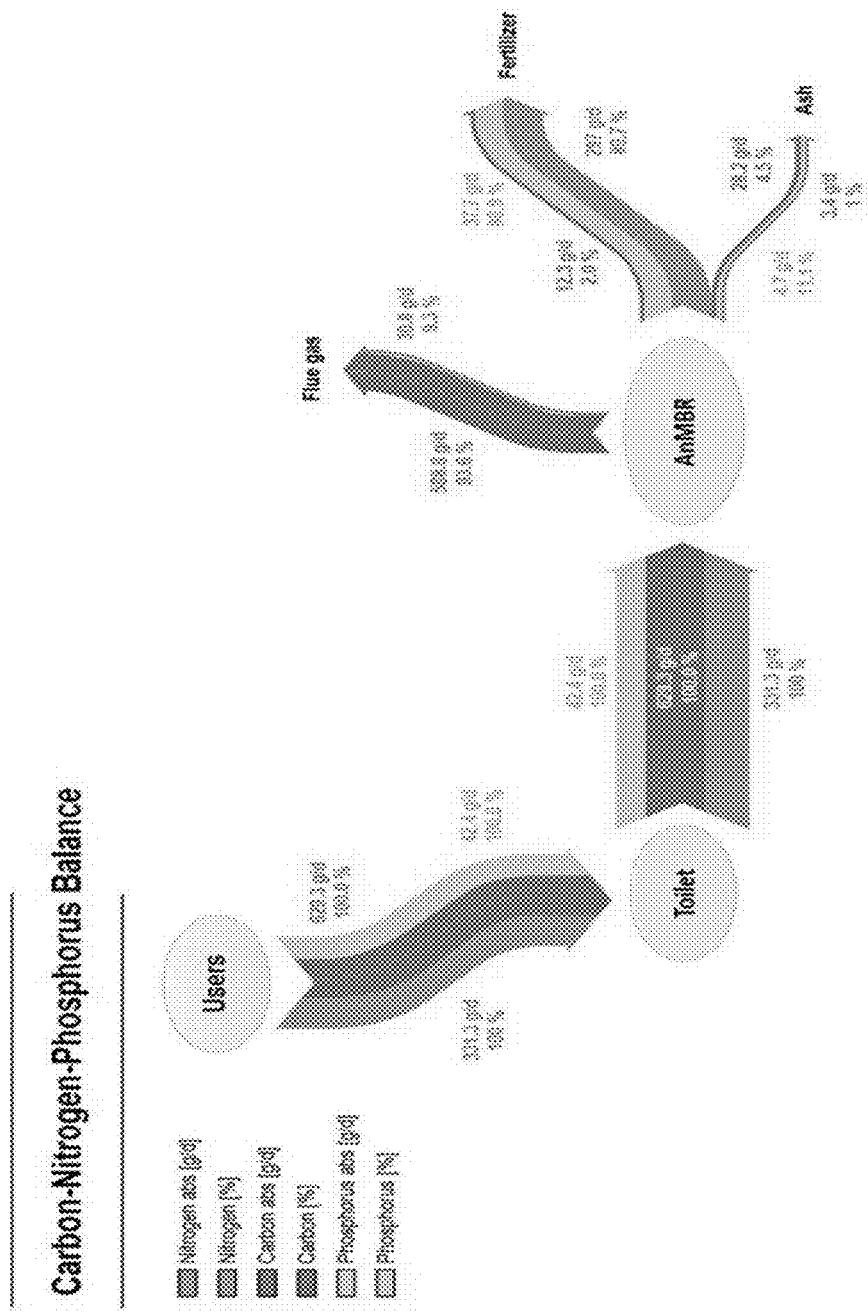
FIG. 11 is a diagrammatic representation of nutrient and element analysis for a combined eToilet and Gas-Lift Anaerobic Membrane Bioreactor (GI-AnMBR) system.

Additionally, FIG. 11 shows the nutrient and element analysis for the GI-AnMBR primary subsystem 200 testing (also reproduced from the Bair paper). This figure illustrates how all nitrogen, carbon, and phosphorous was distributed throughout the same terrestrial test. All three elements that are processed on a daily basis start fully with the users, and are each fully processed from the users to the toilet, and then subsequently to the AnMBR system. At this point, the nitrogen is primarily distributed to fertilizer (89.7%), secondarily distributed to flue gas (9.3%), and finally to ash (1%). Additionally, the carbon is primarily distributed to flue gas (93.6%), secondarily distributed to ash (4.5%), and finally to fertilizer (2%). The phosphorous is primarily distributed to fertilizer (88.9%), with the remainder distributed to ash (11.1%). Both of these figures are based on tests run detailed in the Bair paper mentioned herein.

The output A of the GI-AnMBR primary subsystem 200 flows under a UV light 310, which is present in the UV light primary subsystem 300 and is illustrated in FIG. 6B. The supplied electromagnetic radiation (at wavelength between 200-300 nm) kills 99.99% of microorganisms. This includes, but is not limited to, viruses, cysts, *salmonella, E. coli*, Typhoid Fever, Polio, Cholera, Infectious Hepatitis, Bacteria, Coliform, Giardia, *Cryptosporidium*, Flu, Dysentery, and Meningitis. Primary advantages provided by UV light 310 are freedom from chemicals and requiring no external inputs other than electrical energy 320, which is available in abundance on space structures as set forth above. The UV light 310 also requires an external transparent quartz sleeve that surrounds the lamp, which protects the lamp from contaminated effluent passing through the UV light primary subsystem 300. UV-treated effluent exits the UV light primary subsystem 300 at output B.

Figure 12:
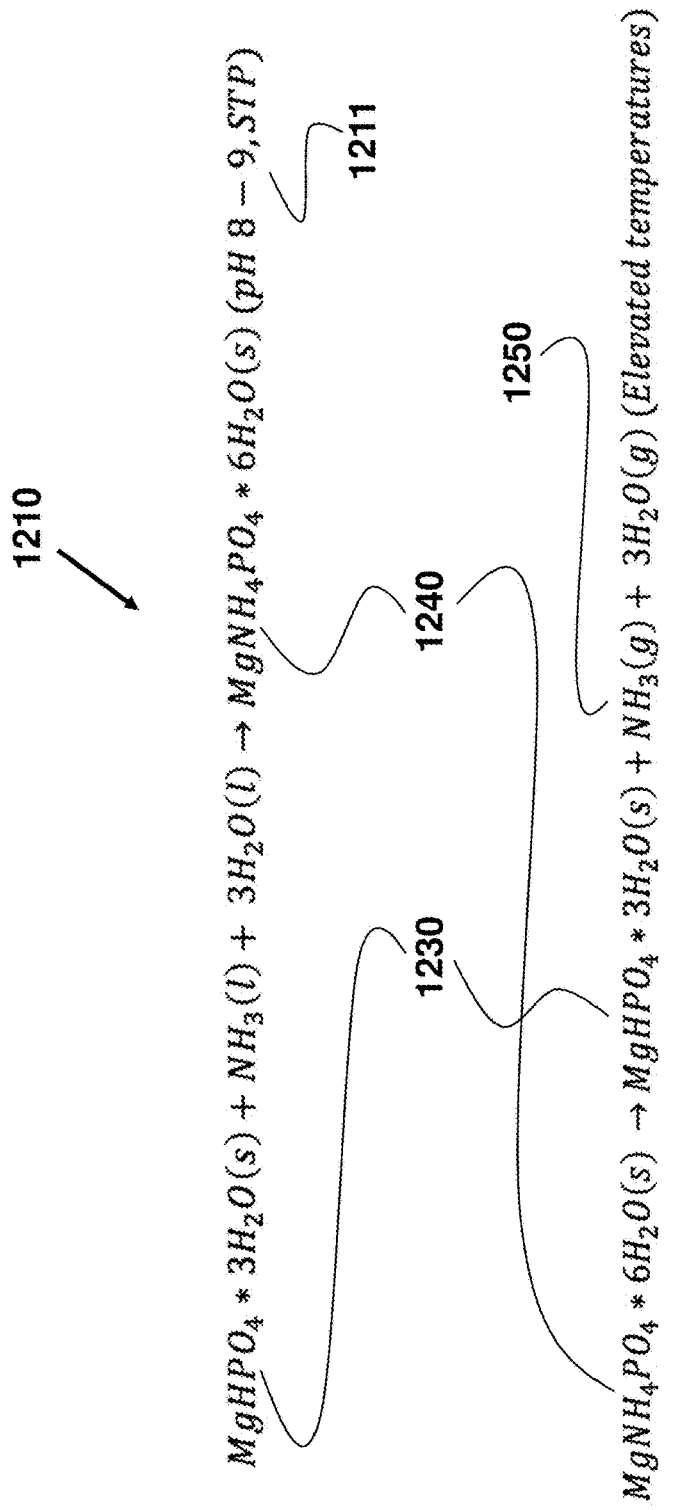
FIG. 12 is a set of formulas describing an exemplary embodiment of chemical reactions that occur in a Magnesium Phosphate Plug Flow Reactor (MP-PFR)/Struvite Regenerator (SR) primary subsystem of the system of FIG. 3.

As seen in FIG. 4, following UV light primary subsystem 300 is the MP-PFR/SR subsystem 400, which is expanded in FIG. 6C, and has, as its input, the effluent from output B. The effluent, still containing ammonia, passes through a plug flow reactor (PFR) containing solid magnesium phosphate, which is referred to herein as a Magnesium Phosphate Plug Flow Reactor (MP-PFR) 410. FIG. 12 describes reactions that occur in the MP-PFR 410, and then, subsequently, in the Struvite Regenerator (SR) 420. Due to the complexity of these processes, the reactions are best shown in a figure format. Additionally, as the regeneration that occurs in the SR 420 directly relates to the reaction in the MP-PFR 410, equations 1210 and 1220 are related, as they occur in sequence—1210 before 1220. For simplicity, in the following descriptions, magnesium phosphate ($MgHPO_4$) is designated with numeral 1230 and struvite ($MgNH_4PO_4$) is designated with numeral 1240. It is noted that a plug flow reactor is not the only possibility for removing ammonia from the effluent. Other ammonia-removing processes can be employed, such as with use of algae and by applying ammonia reducing techniques.

In FIG. 12, the reaction occurring in the MP-PFR 410 is described with equation 1210. When magnesium phosphate 1230 is exposed to liquid ammonia at an elevated pH 1211 in water, it reacts spontaneously to form struvite 1240, a white solid, thus removing the ammonia from the effluent entering the MP-PFR 410. This process is not biological and does not require oxygen, which is an extremely beneficial characteristic of a closed-loop system. A plug flow reactor model is a particularly beneficial exemplary embodiment for removal of ammonia because it permits a chemical reaction to occur in a continuously flowing system having a cylindrical geometry. The chemical reaction occurs as fluids are pumped through a pipe and the reagents travel through the PFR. A changing reaction rate creates a gradient with respect to the fluid's traveled distance. At the inlet of the PFR, the rate is very high, but the reaction rate slows as the reagent concentration decreases and the concentration of the product increases. It is estimated that breakthrough would occur at about every 50-100 bed volumes of magnesium phosphate 1230, which would subsequently require a regeneration cycle for minutes to an hour, where regeneration occurs in the Struvite Regenerator (SR) 420.

In FIG. 12, the reaction occurring in the SR 420 is described with equation 1220. A heat vacuum 430 within the SR heats the struvite 1240, causing the solid to regenerate back into solid magnesium phosphate 1230, while also producing a liquid-vapor solution of 10% ammonia 1250 and 90% water. This liquid-vapor solution will be sent to ACC subsystem 600 as seen in FIGS. 3 and 5, where its use will be explained in full during the detailed description of ACC subsystem 600 from FIG. 7.

Looking back at the MP-PFR/SR subsystem 400 in FIG. 6C, the respective processes have flow input entering the MP-PFR 410, where the reaction 1210 takes place. Out of the MP-PFR 410 comes the effluent with ammonia removed, the effluent being shown as exiting out of the bottom of the MP-PFR 410, as well as the solid struvite 460, which is sent to the SR 420. The only necessary input to the MP-PFR 410 is a caustic 440, which will be provided as sodium hydroxide (NaOH), as it is an output from part of the SFP subsystem 700 (see FIG. 5; NaOH is designated in FIG. 9 with reference numeral 773). The sodium hydroxide 773 is necessary to achieve correct pH 1211. Subsequently, the SR 420 will operate, with the only input being a heat vacuum 430. Output from the SR 420 is magnesium phosphate 450 to be absorbed in the MP-PFR 410, in addition to the previously described liquid-vapor solution of ammonia and water, which is sent to ACC subsystem 600, and can be seen in FIG. 3.

A primary benefit provided by the MP-PFR/SR subsystem 400 is a lack of necessary external inputs. The MP-PFR 410 only requires caustic 440, and the SR only requires a heat vacuum 430. This process results in a 95% removal of ammonia. When compared to biological systems that achieve ammonia removal, this MP-PFR/SR subsystem 400 is advantageous because it requires less contact times (hours compared to days) and has no start up time.

As seen in FIG. 4, following the MP-PFR/SR subsystem 400 is the CEDI subsystem 500. The purpose of CEDI is to separate the brine (salts) from the clean permeate, where permeate is defined as the clean and potable water produced by this subsystem. By removing the brine in an organized and clean manner through CEDI, brine can be salvaged for resource recovery rather than for waste incineration. CEDI's primary benefits include being a closed loop system (aside from energy input 520) and being completely regenerable.

Figure 13:
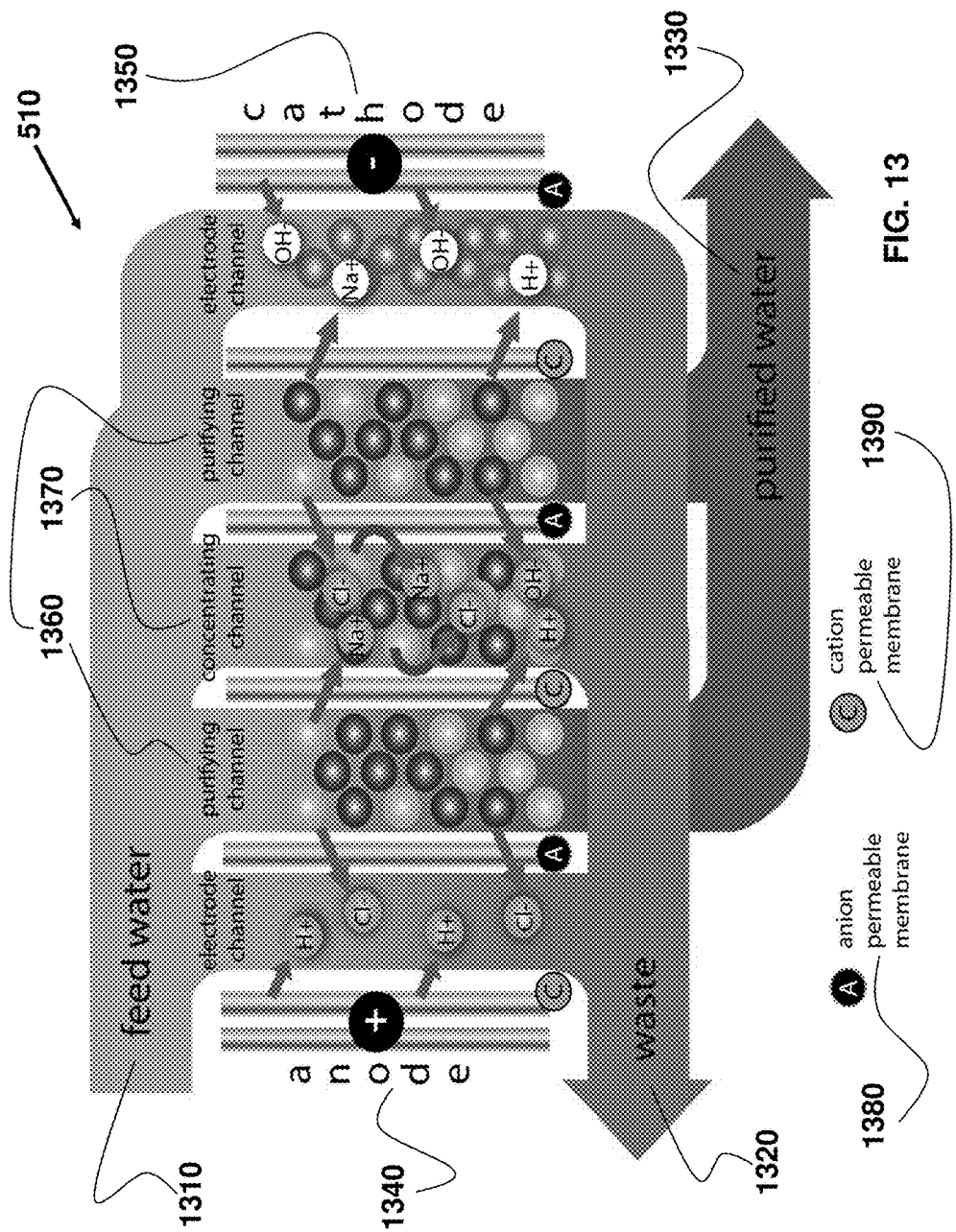
FIG. 13 is a fluid flow diagram illustrating how an exemplary embodiment of a Continuous Electro-Deionization (CEDI) device of the system of FIG. 3 operates.

FIG. 13 offers an expanded view of what occurs inside a CEDI device 510. An anode 1340 and a cathode 1350 are placed on opposite ends of the CEDI device 510, and a DC current is directed along a central axis of the CEDI device 510. Positive ions naturally tend towards the cathode 1350 (negatively charged plate), while the negative ions tend towards the anode 1340 (positively charged plate). Ion exchange membranes made of cation (positively charged) selective resins 1390 are strategically placed to block anions and water molecules. Additionally, anion (negatively charged) selective resins 1380 are strategically added as well to block cations and water molecules where necessary.

As the effluent 1310 (feed water) is fed into the top of the CEDI device 510, it is then pressurized downwards (to account for microgravity) as it is separated into dilute 1360 and concentrate 1370 chambers due to the selective membranes 1380 and 1390. The CEDI device 510 is naturally limited by the slow speed that ions move through water. Additionally, a lower conductivity of water will impede ion removal, so, as initial salts get removed from the water, further salts become increasingly difficult to remove. Adding resins throughout the chambers in the CEDI device 510 accounts for this. The ion exchange resins act as an ion transport bridge, greatly reducing electrical resistance. Taking the Evoqua® CDI-LX™ Systems as one example, the concentrated chambers 1370 result in brine 1320 that is roughly 10% of the total volume of the input 1310, while 90% of the input volume is output as potable water 1330. The highest concentration of ions exists at the top of the CEDI device 510, where the resins act as a transport bridge. At the bottom of the container, an electric field is produced due to the water splitting from $H_2O$ into $OH^-$ and $H^+$. These respective acids and caustics continuously regenerate the transport resins.

The CEDI device 510 is extremely beneficial and an excellent fit for the exemplary embodiment of this closed-loop architecture because it is a chemical free operation and all work is done by electric potential. The CEDI device 510 removes salts, acids, and bases, such as ions, $CO_2$, silica, boron, etc. Any pH shock is also eliminated.

As seen in FIG. 5, there are two secondary subsystems within the overall architecture—the Ammonia Converting Configuration (ACC) 600 and the Sequential Fertilizer Producer (SFP) 700. Both secondary subsystems close the loop to the system architecture through a mass balance approach. Without these two subsystems, there would be approximately a 10% loss from the CEDI subsystem 500, and the ammonia gas 611 produced from the SR 420 would be solely used for plant fertilizers, a smaller necessity than the nitrogen 652 and hydrogen 662 gases that the ACC 600 generates. Without these secondary subsystems, though, the primary architecture is still more efficient than the current system used on the ISS.

More specifically, the ACC 600 takes in ammonia gas, which is output by the SR 420, and outputs nitrogen and hydrogen gases. To understand the ACC subsystem 600, first the chemical reaction that takes place is described. Following this, an actual flow of events that occurs within this subsystem is analyzed using FIG. 7, which shows each individual component, input, and output of the ACC 600, as well as FIG. 14, which describes how a primary component of the ACC 600, a fixed bed membrane reactor, works.

The ACC subsystem 600 is composed of multi-stage fixed bed membrane reactors (MSFBMR) with inter-stage heating and a sweep gas. The input to the ACC subsystem 600 is a liquid-gas solution of ammonia and water/water vapor. The ammonia comprises approximately 10% of that solution. The MSFBMR decompose ammonia to produce high-purity hydrogen and nitrogen gases. A single step endothermic reaction (requiring heat) occurs, as described in Equation 1.

$$NH_3 \rightleftharpoons \frac{1}{2}N_2 + \frac{3}{2}H_2 \left( \Delta H^{\circ}_{298} = 54.6 \frac{kJ}{mol} \right) \qquad [1]$$

The reaction rate of ammonia decomposition is described in Equation 2.

$$R_{NH_3} = 5.131 * 10^{14} \exp\left(-\frac{19656.27}{T}\right) * \left[ \left(\frac{f^2_{NH_3}}{f^2_{H_2}}\right)^{\alpha} - K^2 f_{N_2} \left(\frac{f^2_{H_2}}{f^2_{NH_3}}\right)^{1-\alpha} \right] \qquad [2]$$

The fugacity of component i ($f_i$) is provided by Equation 3. The fugacity coefficient of component i is designated by $\phi_i$, the mole fraction of component i is designated by $Y_i$, and the total pressure is designated by P.

$$f_i = \phi_i Y_i P. \qquad [3]$$

Constant K is described as a function of T in absolute temperature (Kelvin) in Equation 4. Constant α represents a kinetic parameter based on the catalyst used. Constant α generally ranges from 0.4 to 0.8, and for all iron catalysts, α=0.5.

$$\text{Log } K=2.6899+2.001.6T^{-1}+1.84886*10^{-7}T^2-2.691122 \log(T)-5.519265*10^{-5}. \quad [4]$$

Implementation of this decomposition reaction is accomplished through hydrogen perm-selective composite membranes. Thin, dense, and metallic membranes that are 100% selective to hydrogen are used. Hydrogen will separate into protons and electrons at the surface of the membrane, and then recombine on the filtrate side. Possible membrane options include palladium (Pd), Pd alloys, zeolite, and/or silica, to name a few.

Figure 7:
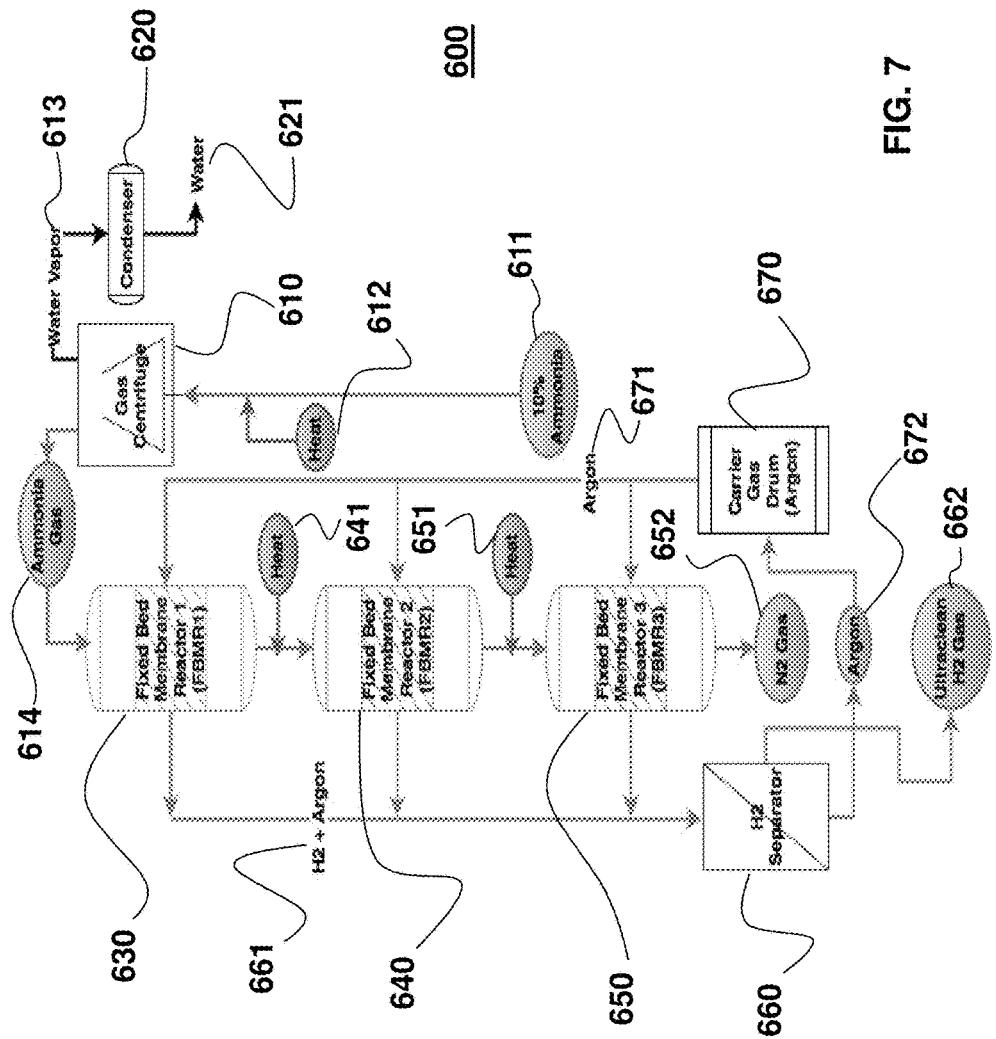
FIG. 7 is a fragmentary, block diagram of an exemplary embodiment of an Ammonia Converting Configuration (ACC) secondary subsystem within the system of FIG. 3.

In FIG. 7, the ACC subsystem 600 is illustrated as its own entity separated from the overall system of FIGS. 3 to 5. The 10% ammonia, 90% water/water vapor liquid-gas solution 611 is initially heated 612 until it reaches a fully gaseous state. This gaseous mixture then enters a gas centrifuge 610, where the ammonia 614 separates from the water vapor 613 based on centrifugal forces and a difference in mass between the ammonia 614 and water vapor 613. Because this gas centrifuge 610 is based on centrifugal and not gravitational forces, implementation in microgravity is not an issue.

The two outputs of the gas centrifuge 610 divide into two different exits (e.g., pipes), where the water vapor 613 continues into a condenser 620, and the pure ammonia gas 614 enters Fixed Bed Membrane Reactor 1 (FBMR1) 630. The condenser 620 cools the water vapor 613 back into liquid water 621, after which it re-enters the effluent system prior to the CEDI subsystem 500. Concurrently, the ammonia gas 614 begins its decomposition in FBMR1 630, as described in Equations 1 to 4.

Figure 14:
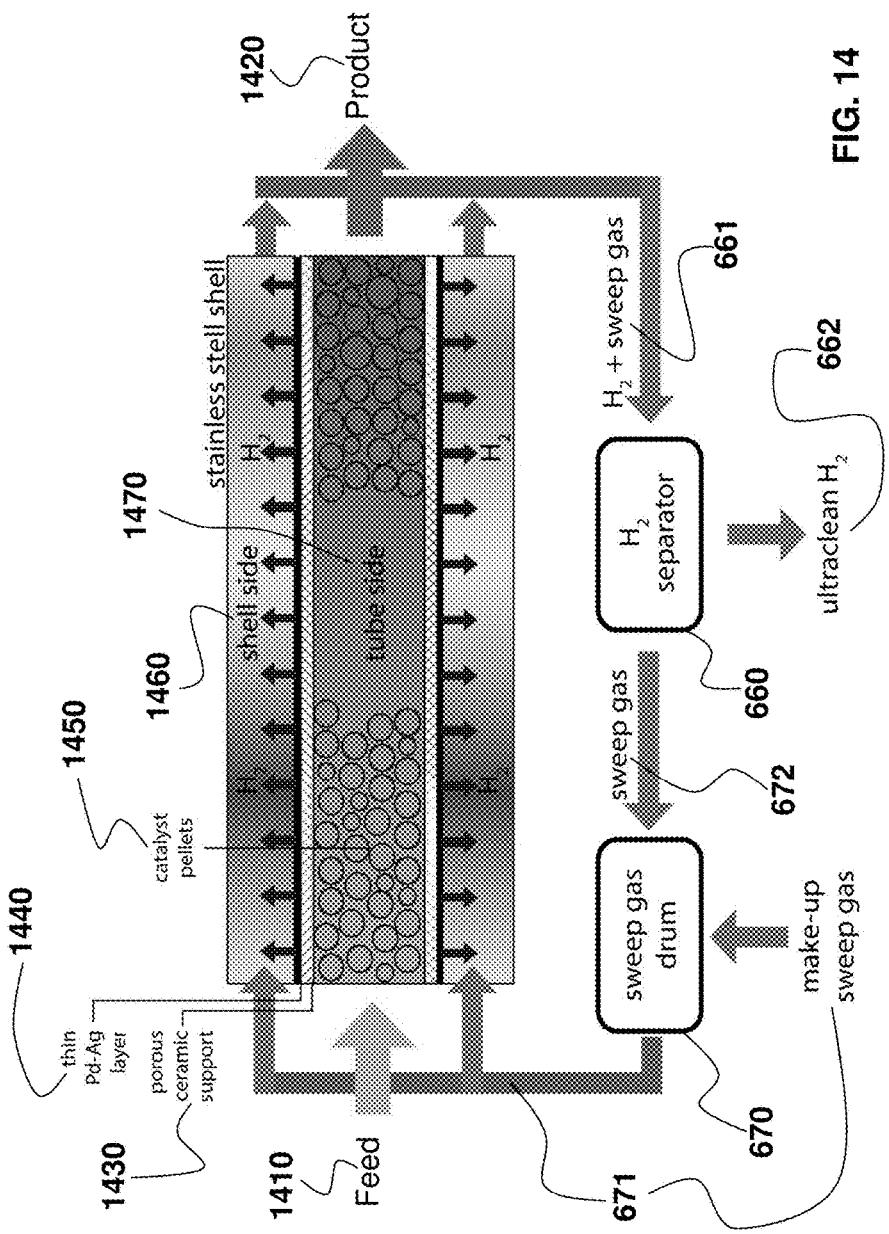
FIG. 14 is a diagrammatic representation of an exemplary embodiment of a single fixed bed membrane reactor system and process flow of the system located in an Ammonia Converting Configuration (ACC) secondary subsystem of the system of FIG. 3.

FIG. 14 illustrates how each individual Fixed Bed Membrane Reactor 630, 640, 650 functions. An input feed 1410 enter on the left side of FIG. 14, and is pressurized towards the exit 1420 (right-side). Catalyst pellets 1450 aid the gas propagation. Throughout the Fixed Bed Membrane Reactor 630, 640, 650, the hydrogen particles transfer through the hydrogen selective membranes 1440 (held in place by a porous ceramic support 1430) from a tube side 1470 to a shell side 1460. A sweep gas 672 stored in a carrier sweep gas drum 670 forces the separated hydrogen 661 into a different direction than the feed 1410. Additionally, make-up sweep gas 671 is available, which, in an exemplary embodiment, is argon because argon can be separated easily from the hydrogen 662 at a later step. The end result of this subsystem is the product gas 1420 separated from ultraclean $H_2$ gas 662.

Referring back to FIG. 7, there are two outputs from FBMR1 630—the above-mentioned hydrogen and argon gas mixture 661, which is sent to a $H_2$ Separator 660, and a resulting output cleaned gas, which is pressurized through a conduit and heated 641 prior to entering Fixed Bed Membrane Reactor 2 (FBMR2) 640. The purpose of this heat pretreatment is to increase the rate of ammonia decomposition. Within FBMR2 640 the same process as FBMR1 630 occurs. From FBMR2 640, the hydrogen and argon gas output 661 is sent to the same output conduit as the hydrogen/argon output from FBMR1 630, with the output from FBMR2 being sent for another heat pretreatment 651 before entering Fixed Bed Membrane Reactor 3 (FBMR3) 650. The same process is repeated within this third reactor. From FBMR3 650, the hydrogen and argon gas 661 exits to the $H_2$ Separator 660, while the rest of the output is considered clean nitrogen ($N_2$) gas 652, meaning that it contain no hydrogen (or virtually no hydrogen). This valuable final output of the ACC is used for resupply of breathing air for life support aboard a space structure (e.g., the ISS) or on another planet such as Mars. Finally, the hydrogen and argon gas mixture 661 accumulates within the $H_2$ Separator 660. Using another membrane, the mixture 661 is separated into ultraclean hydrogen gas 662 and argon gas 672. The hydrogen gas 662 is an extremely valuable final output of the ACC 600 because, for example, it can be used for launch propulsion applications (a huge need for Mars applications), while the argon gas 672 is sent back to the Carrier Gas Drum 670 for resupply as the sweep gas 671 for FBMR1 630, FBMR2 640, and FBMR3 650.

As seen in FIG. 5, the other secondary subsystem is the Sequential Fertilizer Producer (SFP) 700. The SFP subsystem 700 is relatively complex in nature and has many discrete sections that work in tandem to produce desired outputs. This helps to make the entire WP system function in a closed loop. To better understand the SFP subsystem 700, reference is made to FIG. 8, which outlines the components of the SFP subsystem 700, and to FIG. 9, which outlines individual sub-assemblies and parts. The following paragraphs discuss each part, referring to each of these figures throughout. Additionally, it is noted that three of the outputs from the SFP subsystem 700 are shown in FIG. 9. At the bottom of FIG. 9, hydrochloric acid (HCl) 772 is designated with a diamond shape, sodium hydroxide (NaOH) 773 is designated with a triangle shape, and potassium hydroxide (KOH) 774 is designated with an upside-down triangle shape. These chemicals are used as inputs throughout the system, and are referred to by these reference numerals.

Input to the SFP subsystem 700 is brine 711, which is output from the CEDI subsystem 500. The brine 711 is densely packed with salts. In the current ISS water purification system, for example, brine is compacted into a puck that is incinerated upon return to Earth. The SFP subsystem 700 provides a useful alternative to this wasteful process because, in the present system, the salts are harnessed for various uses aboard the space structure (such as on the ISS) or on Mars. The resulting weakened brine 775 output from the SFP subsystem 700 is re-routed back to the primary architecture for a re-run through the CEDI subsystem 500.

A first step to the SFP subsystem 700 is solidifying the salts 731 within the brine 711 and separating them from the water solution 721 in which they lie. This process is extremely complex due to microgravity on a space structure such as the ISS. Terrestrially, this process would be simple. The brine would be boiled and water would evaporate into water vapor, leaving the remaining solid salts at the bottom of a container due to gravitational forces. In space, however, there are many associated difficulties to this process.

Without gravity, only a portion of the solution to which heat is applied experiences the phase change from liquid to gas. On Earth, when water is boiled from a heat source beneath the solution, gaseous water vapor rises due to gravity, and the remaining liquid water moves downward to receive heat treatment. This is known as natural convection. In space, this phenomenon does not occur because there is no gravity to cause the liquids to fall as the gas rises. With a conventional boiling system where a heat source lies beneath a container of liquid, bubbles would form with trapped energy creating a gaseous interior and the remaining liquid comprising the exterior. Under these conditions, salts will not solidify because not all of the liquid evaporates into gas, so this does not provide a viable method for drying the salts.

Figure 8:
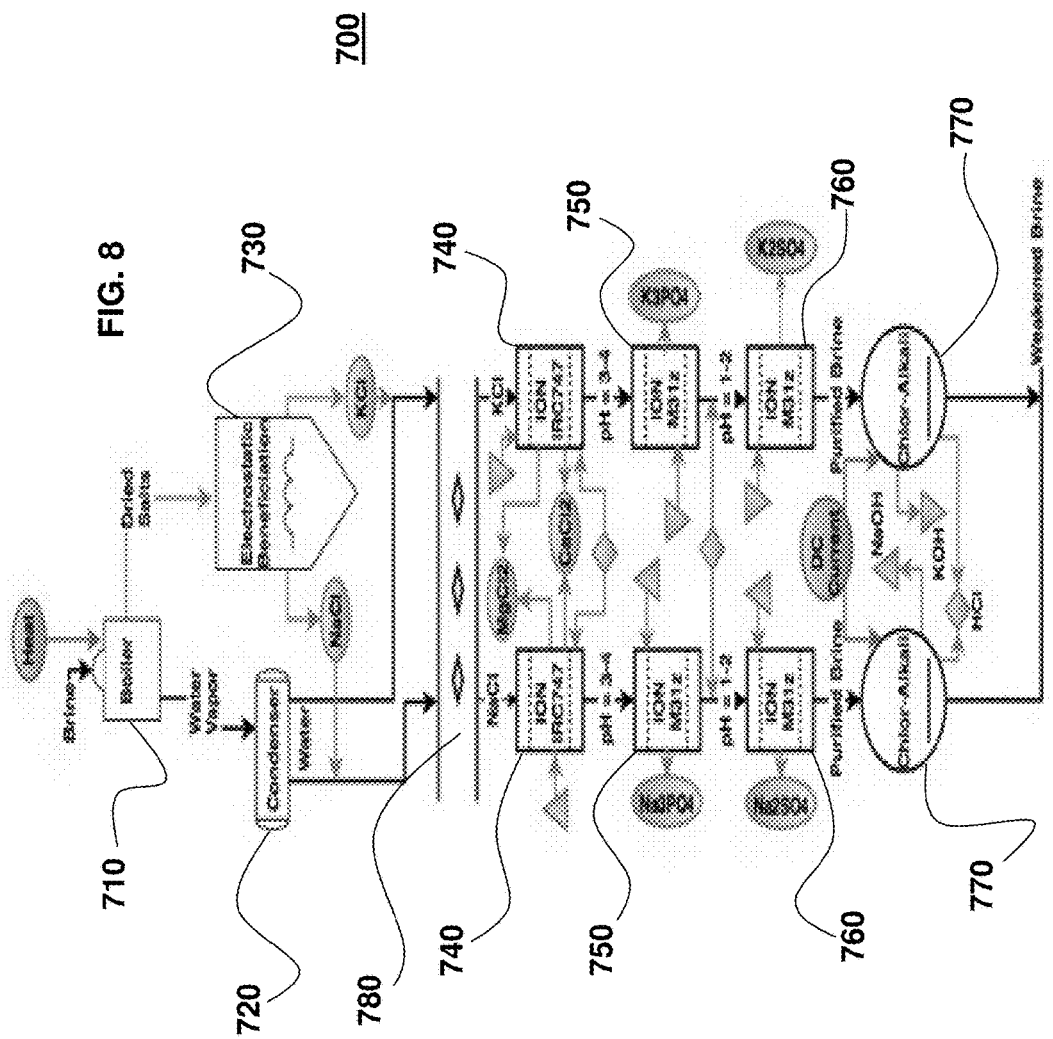
FIG. 8 is a fragmentary, block diagram of an exemplary embodiment of a Sequential Fertilizer Producer (SFP) secondary subsystem within the system of FIG. 3.
Figure 9:
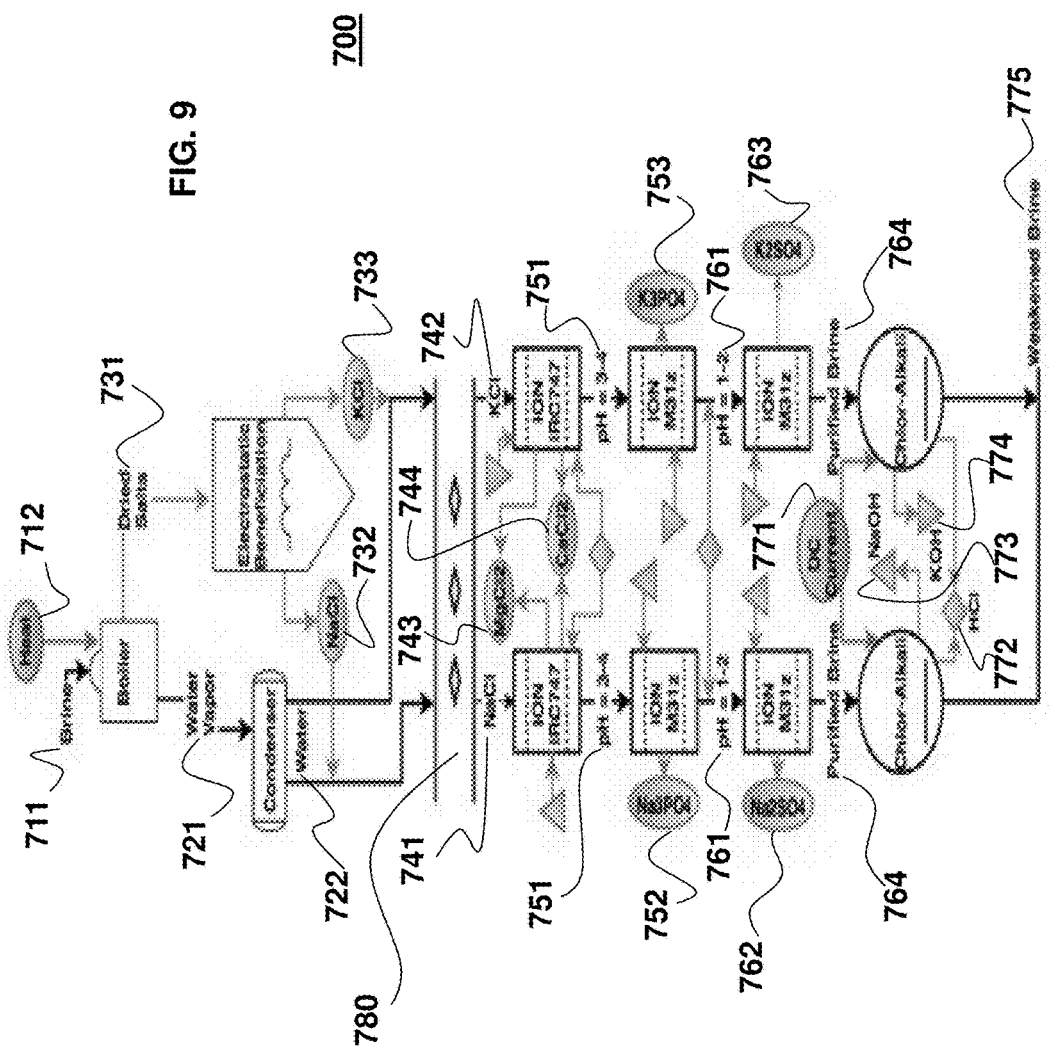
FIG. 9 is a fragmentary, block diagram of the Sequential Fertilizer Producer (SFP) secondary subsystem of FIG. 8 with reference numerals indicating different parts.

A novel system is, therefore, necessary to work around microgravity and is presented in FIGS. 8 and 9. First, a specified quantity of liquid brine 711 is forced into a boiling container 710, where this value will be based on the amount of daily user input to the entire WP system 100. The flow then is temporarily shut off for a given amount of time, also based on a factor of how much user input 100 is given on a daily basis. The boiling container 710 then is heated 712 through its central axis by a heat source, for example, in the shape of a rod. Concurrently, the boiling container 710 spins to produce a centrifugal force. This centrifugal force replaces the gravitational force from Earth, and works against the surface tension that holds the bubbles against the surfaces of the container. Additionally, non-illustrated agitators within the boiling container 710 break up "bubbles" that form. In one exemplary embodiment, the agitator is the heat rod 712 itself, which moves in a circular motion relative to the spinning of the actual container (e.g., in the opposite direction). By using the heat rod 712 as the agitator, a need for additional moving parts is eliminated.

At a certain point, all of the liquid water will evaporate into water vapor 721, and solid salts 731 will form within the container. Unfortunately, as there is no gravitational force, these salts 731 will be "floating" within the vacuum of the container. In order to separate the water vapor 721 from the salts 731, a pressurized vacuum, equipped with a filter at its input, is implemented. The filter has holes small enough to reject salts as they impact the filter. The vacuum pulls all of the water vapor 721 out of the container and stores it in a different conduit or container. The flow of the vacuum is then reversed, and the salts 731 that stuck to the filter will flow back into the container. This requires storage of a carrier gas to produce this desired flow. Next, the vacuum is removed and an automated moving wall physically "pushes" the floating salts 731 into a separate compartment. One exemplary embodiment can be a plunger having a shape corresponding to the interior circumference of the boiling container 710. Meanwhile, the water vapor 721 that was pulled out of the boiling container 710 using the vacuum enters a condenser 720, where it cools back into liquid water 722. Once this is complete, a new flow of brine 711 enters the boiling container 710 and the process repeats.

At this point, the dried salts 731 will be a mix of sodium chloride (NaCl) 732 and potassium chloride (KCl) 733. In order to achieve desired products out of the SFP 700, these salts 732, 733 need to be separated into different flows. Electrostatic beneficiation 730 is implemented using an aluminum tribocharger. Triboelectric charging causes certain materials to become electrically charged when they come into frictional contact with specific materials. In this exemplary embodiment, the charge difference between the aluminum and the dried salts 731 produces an electrical charge through surface contact.

One exemplary embodiment of a tribocharger is a long helix of aluminum generally in the shape of a rod. The helix form allows for more surface contact when the salts 731 are agitated. The dried salts 731 are forced through the tribocharger with pressure. While the salts 731 and aluminum are in contact, the material with a higher affinity for electrons will become negatively charged. Likewise, the other material having a lower affinity for electrons will become positively charged. This creates a desired difference in charge between the NaCl 732 and the KCl 733. The produced difference in electrical conductivity is a conditioning step to allow for separation of the two minerals. Now that the salts have equal but opposite charges, they are placed between polarized plates facing one another. The KCl 733 develops a negative charge and is attracted towards the positive electrode and the NaCl 732 develops a positive charge and is attracted towards the negative electrode. "Bins" are placed beneath each electrode and, when the respective salts contact the plates, the salts are forced downwards into the bins through pressure through a stored carrier gas not shown. Because this process is based on electromagnetic forces and not upon gravitational forces, it is ideal for microgravity conditions in space.

The result of this electrostatic beneficiation 730 is the filling of two separate bins, one containing NaCl 732 and one containing KCl 733. As seen in FIG. 9, each of these salts 732, 733 is mixed back with the water 722 emitted from the condenser 720 to form two separate brine solutions, an NaCl solution 741 and a KCl solution 742.

The next steps involve a series of ion exchange resin processes that produce various plant fertilizers and useful salts. The NaCl 741 and KCl 742 solutions are run in parallel through their own respective resin systems and the parallel process is designated with reference numeral 780.

Ion exchange resins 740 are utilized to remove any remaining hardness in the brine, made up mostly of calcium and magnesium. One exemplary ion exchange resin is Amberlite® IRC 747 (Dow Water and Process). These chelating macroporous resins are regenerated with hydrochloric acid (HCl) 772 and either sodium hydroxide (NaOH) 773 or potassium hydroxide (KOH) 774, depending on which flow (NaCl 741 and KCl 742, respectively) is being processed. All three of these regeneration chemicals are obtained from the chlor-alkali process 770, which is described below. These resins produce both magnesium chloride ($MgCl_2$) 743 and calcium chloride ($CaCl_2$) 744. As explained previously, these are both useful fertilizers for the hydroponic plant system 900.

The reactions on the NaCl 741 side are shown (for example, as they pertain to the production of $CaCl_2$ 744) in equations 5 to 7 below. Equation 5 describes the reaction when the resin is loaded, equation 6 describes the reaction when the resin is regenerated, and equation 7 describes the reaction when the resin is converted back to $Na^+$ form. Additionally, it is noted that a minimum recommended pH of the influent brine is approximately 4.5. If the pH drops below this minimum, performance deteriorates.

$$2\ Resin\text{–}Na^+ + Ca^{2+} \rightarrow 2\ Resin\text{–}Ca^{2+} + 2Na\ (Loading) \qquad [5]$$

$$2\ Resin\text{–}Ca^{2+} + HCl^+(in\ excess) \rightarrow 2\ Resin\text{–}H^+ + CaCl_2\ (Regeneration) \qquad [6]$$

$$2\ Resin\text{–}H^+ + NaOH \rightarrow 2\ Resin\text{–}Na^+ + H_2O\ (Converting\ back\ to\ Na^+\ form) \qquad [7]$$

Following operation of the ion exchange resins 740, the effluent of these resins operates at a pH level of approximately 3 to 4 751. The flow is run through, for example, Dowex® M31 resins 750, which are modified to create M31z resins by adding hydrous zirconium oxide to the cation exchange resin. This configuration allows for an improved usability and better kinetics, while not decreasing contact times or pHs.

At a pH level of approximately 3 to 4, this M31z resin 750 removes phosphates from the brine, producing trisodium phosphate ($Na_3PO_4$) 752 and tripotassium phosphate ($K_3PO_4$) 753, respectively. These resins are regenerated with NaOH 773 and KOH 774, respectively.

Following this step, and prior to the next ion exchange resins, the effluent from resin 750 is treated to lower the pH levels of the effluent 761 to between approximately 1 and 2. This is accomplished by adding HCl 772 to the solutions within the transport conduits.

The following ion exchange resins M31z 760 are almost identical to the step for the M31z resins 750, except that the input to the ion exchange resin has been modified. This time through, the pH of the effluent 761 has been lowered to between approximately 1 and 2, which allows this same M31z resin to remove sulfates, rather than phosphates. The outputs of these resins M31z 760 will be sodium sulfate ($Na_2SO_4$) 762 and potassium sulfate ($K_2SO_4$) 763, respectively. Like the previous step utilizing M31z resin 750, these M31z resins 760 are regenerated with NaOH 773 and KOH 774 as well. The remaining solution that flows out of 760 is purified brine 764.

After passing through all of the ion exchange resins, the brine 764 undergoes a chlor-alkali process 770. The chlor-alkali process 770 is used to obtain useful chemicals from the NaCl and KCl purified brines 764. The following reactions in equations 8 and 9 illustrate the chlor-alkali process 770 for the NaCl brine 741.

$$2NaCl + 2H_2O \rightarrow Cl_2 + H_2 + 2NaOH \text{ (requires energy)} \quad [8]$$

$$Cl_2(g) + H_2(g) \rightarrow 2HCl(g) \text{ (exothermic in an aqueous solution)} \quad [9]$$

The chlor-alkali process 770 is an electrolysis process using membranes and requires high levels of energy 771. The energy draw 771 could create uncertainty as to whether the process is beneficial to a space structure such as the ISS, but, for the time being, it enables the closed-loop, which is the desired result. Additionally, outputs of the chlor-alkali process 770 (HCl 772, NaOH 773, and KOH 774) are all useful outputs, as they are able to regenerate previous parts of the SFP 700, making it even more of a closed-loop system. Finally, the weakened effluent brine 775 is recycled through the CEDI subsystem 500 (see e.g., FIG. 5), which allows it to run through the system once again.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A water purification system, comprising:
a bioreaction subsystem comprising:
an input receiving contaminated input effluent;
a gas-lift anaerobic membrane bioreactor that removes at least one of urea and organic matter from the input effluent to create a first effluent; and
a bioreaction output through which passes the first effluent;
a light-treatment subsystem comprising:
an input fluidically connected to the bioreaction output and receiving the first effluent;
an ultraviolet (UV) light exposing the first effluent to UV light to create a second effluent substantially free from microorganisms; and
a UV output through which passes the second effluent;
a reactor subsystem comprising:
an ammonia-reducing reactor comprising:
an input fluidically connected to the UV output and receiving the UV-treated second effluent; and
a reactor output; and
a struvite regenerator fluidically connected to the reactor output, separating ammonia from the second effluent in the ammonia-reducing reactor, and outputting the ammonia; and
a separation subsystem comprising:
an input fluidically connected to the reactor output and receiving the second effluent substantially free from ammonia;
a continuous electro-deionization device separating brine/salts from the second effluent to produce potable water; and
having a potable water output.

2. The system according to claim 1, wherein the gas-lift anaerobic membrane bioreactor receives input energy selected from at least one of thermal energy and electrical energy.

3. The system according to claim 1, wherein the gas-lift anaerobic membrane bioreactor outputs at least one of solid fertilizers, methane, and carbon dioxide.

4. The system according to claim 3, wherein methane output by the gas-lift anaerobic membrane bioreactor is recirculated and used to provide energy to the gas-lift anaerobic membrane bioreactor.

5. The system according to claim 3, further comprising a dissolver that converts the solid fertilizers into liquid fertilizers, the solid fertilizers output by the gas-lift anaerobic membrane bioreactor being passed through the dissolver.

6. The system according to claim 1, wherein the microorganisms include at least one of viruses, cysts, *salmonella*, *E. coli*, Typhoid Fever, Polio, Cholera, Infectious Hepatitis, Bacteria, Coliform, Giardia, *Cryptosporidium*, Flu, Dysentery, and Meningitis.

7. The system according to claim 1, wherein the ultraviolet light comprises an ultraviolet lamp and an external transparent quartz sleeve surrounding the lamp and protecting the lamp from the first effluent passing therethrough.

8. The system according to claim 1, wherein the ammonia-reducing reactor removes ammonia from the second effluent with at least one of:
a magnesium phosphate plug flow reactor;
algae; and
ammonia reducing techniques.

9. The system according to claim 8, wherein the ammonia-reducing reactor uses at least one of an additional regenerator and a membrane to regenerate magnesium phosphate.

10. The system according to claim 8, wherein the ammonia-reducing reactor uses at least one of an additional regenerator and a membrane to filter the effluent of the ammonia-reducing reactor.

11. The system according to claim 1, wherein:
the continuous electro-deionization device comprises:
a top;
an anode;
a cathode opposite the anode and defining a central axis;
a power source supplying a DC current directed along the central axis;
ion exchange membranes of:
cation selective resins between the anode and the cathode to block anions and water molecules; and
anion selective resins between the anode and the cathode to block cations and water molecules, the ion exchange membranes forming dilute chambers and concentrate chambers; and
the second effluent is fed into the top of the continuous electro-deionization device and is pressurized downwards to be separated into the dilute and concentrate chambers.

12. The system according to claim 1, further comprising an ammonia-converting secondary subsystem receiving the ammonia output by the struvite regenerator and outputting at least one of nitrogen gas and hydrogen gas.

13. The system according to claim 12, wherein the ammonia-converting secondary subsystem:
receives the ammonia as a liquid-gas solution of ammonia and water and/or water vapor;
heats the liquid-gas solution until fully gaseous;
directs the gaseous solution into a gas centrifuge where ammonia gas separates from the water vapor and is output into two respective exits;
has a condenser receiving the separated water vapor and cooling the water vapor into liquid water and introducing the liquid water into the separation subsystem; and
has a fixed-bed membrane reactor receiving the ammonia gas and decomposing the ammonia gas into the nitrogen gas and the hydrogen gas.

14. The system according to claim 1, further comprising a sequential fertilizer producer secondary subsystem receiving the brine from the continuous electro-deionization device and producing fertilizers for use in a hydroponic plant system.

15. The system according to claim 14, wherein:
the sequential fertilizer producer secondary subsystem comprises a series of ion exchange resins and outputs sodium hydroxide that is input to the ammonia-reducing reactor; and
the fertilizers comprise at least one of trisodium phosphate, tripotassium phosphate, sodium sulfate, and potassium sulfate.

16. A closed-loop water purification system, comprising:
a bioreaction subsystem comprising:
an input receiving contaminated input effluent;
a gas-lift anaerobic membrane bioreactor that removes at least one of urea and organic matter from the input effluent to create a first effluent; and
a bioreaction output through which passes the first effluent;
a light-treatment subsystem comprising:
an input fluidically connected to the bioreaction output and receiving the first effluent;
an ultraviolet (UV) light exposing the first effluent to UV light to create a second effluent substantially free from microorganisms; and
a UV output through which passes the second effluent;
a reactor subsystem comprising:
an ammonia-reducing reactor comprising:
an input fluidically connected to the UV output and receiving the UV-treated second effluent; and
a reactor output; and
a struvite regenerator fluidically connected to the reactor output, separating ammonia from the second effluent in the ammonia-reducing reactor, and outputting the ammonia;
a separation subsystem comprising:
an input fluidically connected to the reactor output and receiving the second effluent substantially free from ammonia;
a continuous electro-deionization device separating brine/salts from the second effluent to produce potable water; and
having a potable water output;
an ammonia-converting secondary subsystem receiving the ammonia output by the struvite regenerator and outputting at least one of nitrogen gas and hydrogen gas; and
a sequential fertilizer producer secondary subsystem receiving the brine from the continuous electro-deionization device and producing fertilizers for use in a hydroponic plant system, the bioreaction subsystem, the light-treatment subsystem, the reactor subsystem, the separation subsystem, the ammonia-converting secondary subsystem, and the sequential fertilizer producer being connected together to as a closed-loop system.

* * * * *